United States Patent
Park

(10) Patent No.: US 10,205,933 B2
(45) Date of Patent: Feb. 12, 2019

(54) DEPTH IMAGE ACQUISITION APPARATUS AND METHOD OF ACQUIRING DEPTH INFORMATION

(71) Applicant: SAMSUNG ELECTRONICS CO., LTD., Suwon-si (KR)

(72) Inventor: Yonghwa Park, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 310 days.

(21) Appl. No.: 14/622,283

(22) Filed: Feb. 13, 2015

(65) Prior Publication Data
US 2016/0065942 A1 Mar. 3, 2016

(30) Foreign Application Priority Data
Aug. 29, 2014 (KR) .................. 10-2014-0114239

(51) Int. Cl.
*H04N 13/254* (2018.01)
*H04N 13/271* (2018.01)
(Continued)

(52) U.S. Cl.
CPC ......... *H04N 13/271* (2018.05); *G01S 7/4816* (2013.01); *G01S 17/89* (2013.01); *H04N 13/254* (2018.05)

(58) Field of Classification Search
CPC .......... G06T 15/00; G06K 9/00; H04N 13/02; H05B 37/02
See application file for complete search history.

(56) References Cited

U.S. PATENT DOCUMENTS 4,935,616 A 6/1990 Scott
5,081,530 A 1/1992 Medina
(Continued)

FOREIGN PATENT DOCUMENTS

KR 10-0730406 B1 6/2007
KR 10-2010-0080092 A 7/2010
(Continued)

OTHER PUBLICATIONS

Hansard, M., Lee, S., Choi, O., and Horaud, R.(2012) Time of Flight Cameras: Principles, Methods, and Applications. Springer, pp. 95, 2012, Springer Briefs in Computer Science, ISBN 978-1-4471-4658-2.*

*Primary Examiner* — Jeffery A Williams
*Assistant Examiner* — Patricia I Young
(74) *Attorney, Agent, or Firm* — Sughrue Mion, PLLC

(57) ABSTRACT

A depth image acquisition apparatus and a method of acquiring depth information are provided. The method of acquiring depth information includes: sequentially projecting, to a subject, N different beams of light emitted from a light source for a time period including an idle time for each of the N different beams of transmitted light, where N is a natural number that is equal to or greater than 3; modulating, using a light modulation signal, beams of reflected light that are obtained by reflection of the N different beams from the subject; obtaining N phase images corresponding to the N different beams of light by capturing, using a rolling shutter method, the modulated beams of reflected light; and obtaining depth information by using the obtained N phase images.

19 Claims, 18 Drawing Sheets

(51) Int. Cl.
   *G01S 17/89*   (2006.01)
   *G01S 17/36*   (2006.01)
   *G01S 17/10*   (2006.01)
   *B82Y 20/00*   (2011.01)
   *G01S 7/481*   (2006.01)

(56) References Cited

U.S. PATENT DOCUMENTS

| | | |
|---|---|---|
| 6,057,909 A | 5/2000 | Yahav et al. |
| 6,088,086 A | 7/2000 | Muguira et al. |
| 6,100,517 A | 8/2000 | Yahav et al. |
| 6,331,911 B1 | 12/2001 | Manassen et al. |
| 6,794,628 B2 | 9/2004 | Yahav et al. |
| 6,856,355 B1 | 2/2005 | Ray et al. |
| 7,095,487 B2 | 8/2006 | Gonzalez-Banos et al. |
| 7,230,685 B2 | 6/2007 | Suzuki et al. |
| 8,194,303 B2 | 6/2012 | Park et al. |
| 8,432,599 B2 | 4/2013 | Cho et al. |
| 8,462,196 B2 | 6/2013 | Kim et al. |
| 8,611,610 B2 | 12/2013 | Park et al. |
| 8,711,463 B2 | 4/2014 | Han et al. |
| 2008/0211737 A1 | 9/2008 | Kim et al. |
| 2010/0182671 A1 | 6/2010 | Park |
| 2010/0163889 A1 | 7/2010 | Park et al. |
| 2010/0308211 A1 | 12/2010 | Cho et al. |
| 2010/0321755 A1 | 12/2010 | Cho et al. |
| 2010/0328750 A1 | 12/2010 | Kim et al. |
| 2011/0074659 A1 | 3/2011 | Park et al. |
| 2011/0181936 A1 | 6/2011 | Cho et al. |
| 2011/0170160 A1 | 7/2011 | Park et al. |
| 2012/0069176 A1 | 3/2012 | Park et al. |
| 2012/0162197 A1 | 6/2012 | Park et al. |
| 2012/0162380 A1 | 6/2012 | Cho et al. |
| 2012/0300038 A1 | 11/2012 | You et al. |
| 2012/0307084 A1 | 12/2012 | Mantzel et al. |
| 2013/0101176 A1 | 4/2013 | Park et al. |
| 2013/0201183 A1 | 8/2013 | Park et al. |
| 2014/0300701 A1 | 10/2014 | Park et al. |

FOREIGN PATENT DOCUMENTS

| | | |
|---|---|---|
| KR | 10-2010-0084018 A | 7/2010 |
| KR | 10-2011-0081649 A | 7/2011 |
| KR | 10-2011-0085785 A | 7/2011 |
| KR | 10-2012-0030196 A | 3/2012 |
| KR | 10-2012-0061379 A | 6/2012 |
| KR | 10-2012-0071970 A | 7/2012 |
| KR | 10-2012-0075182 A | 7/2012 |
| KR | 10-2012-0077417 A | 7/2012 |
| KR | 10-2012-0130937 A | 12/2012 |
| KR | 10-2013-0045018 A | 5/2013 |
| KR | 10-2014-0004728 A | 1/2014 |
| KR | 10-2014-0121710 A | 10/2014 |
| KR | 10-1450670 B1 | 10/2014 |

* cited by examiner

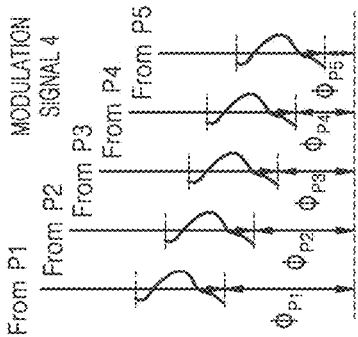
FIG. 2A
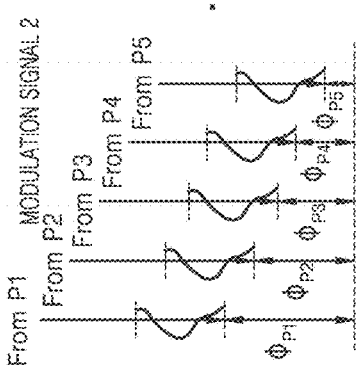
FIG. 2B
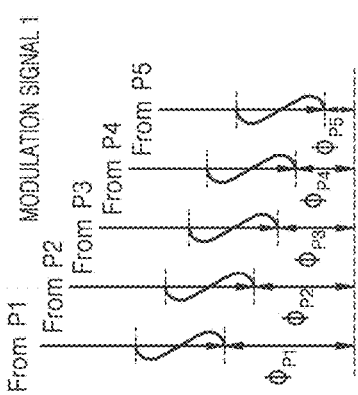
FIG. 2C
FIG. 2D

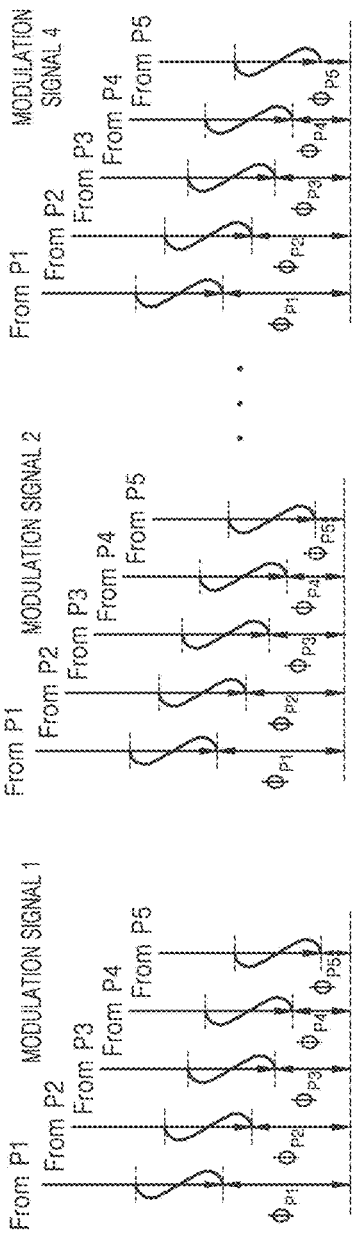
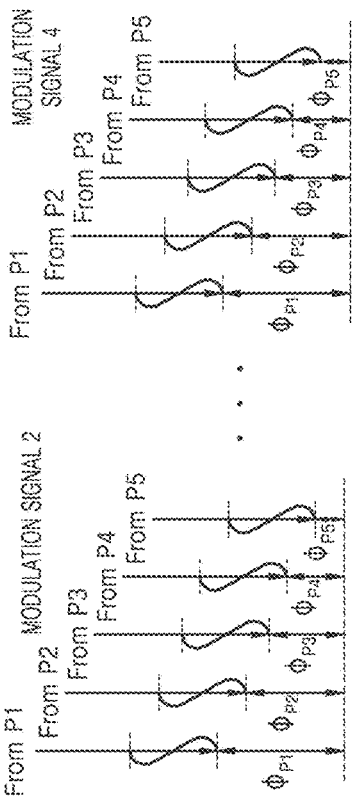
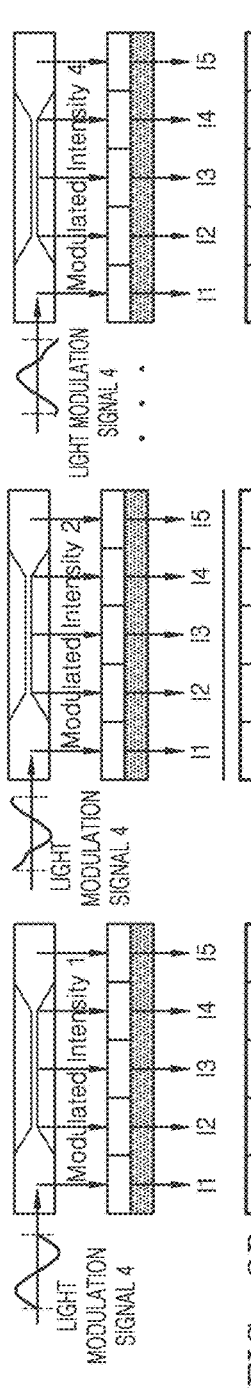
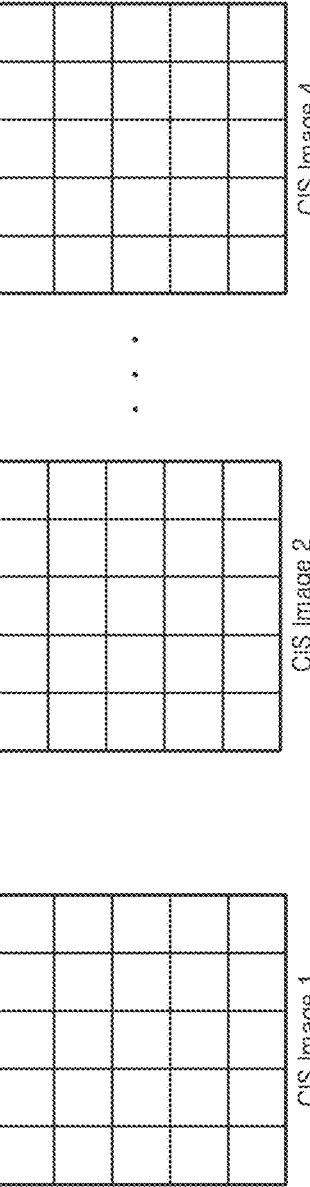

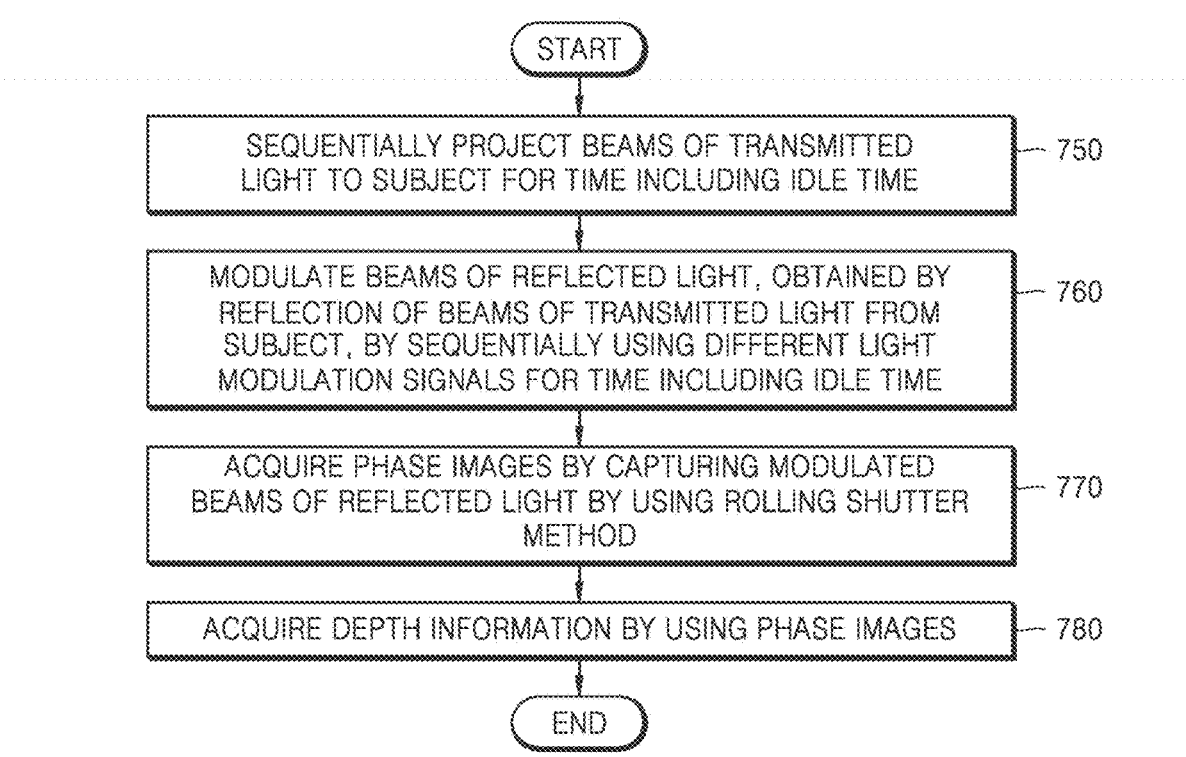

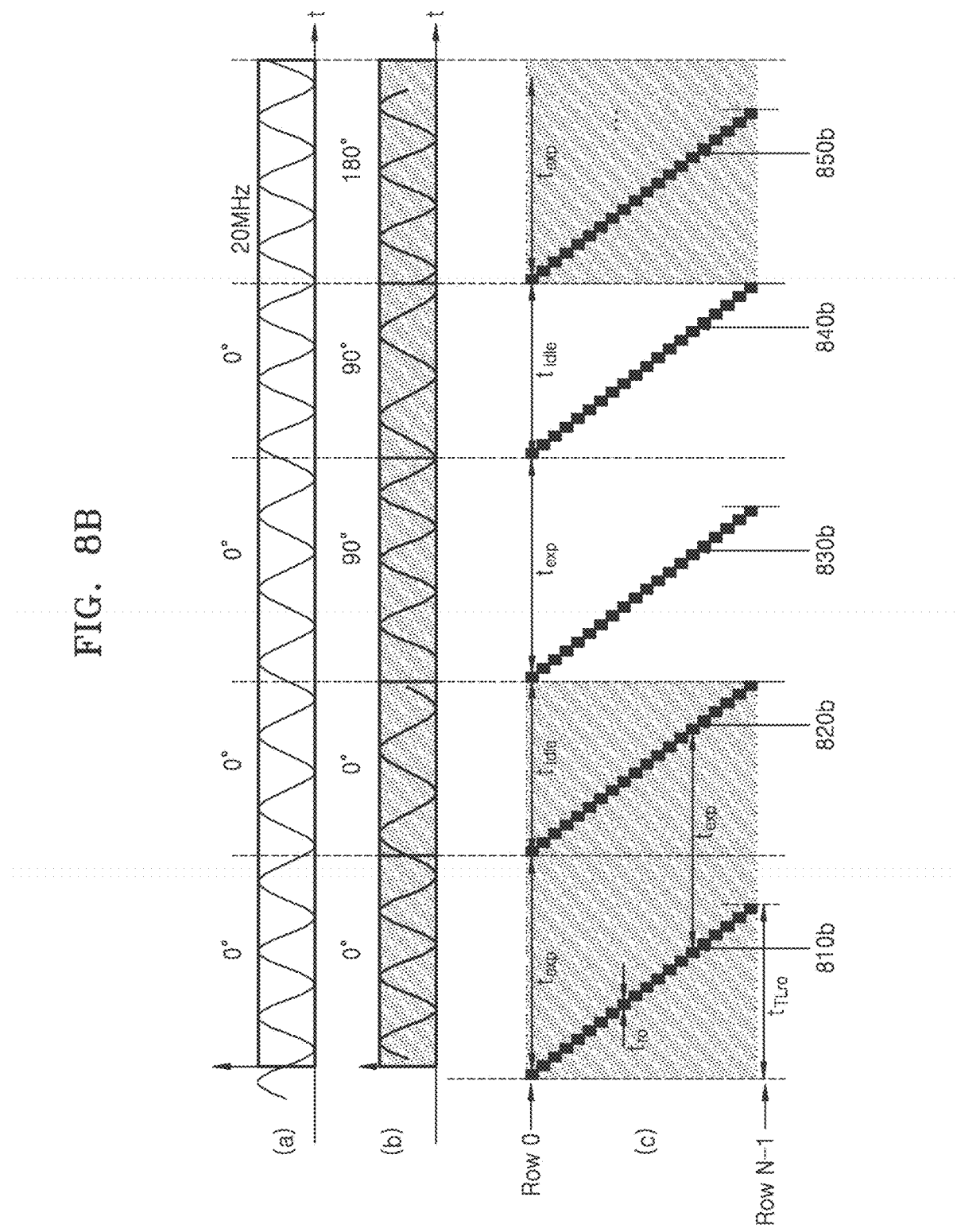

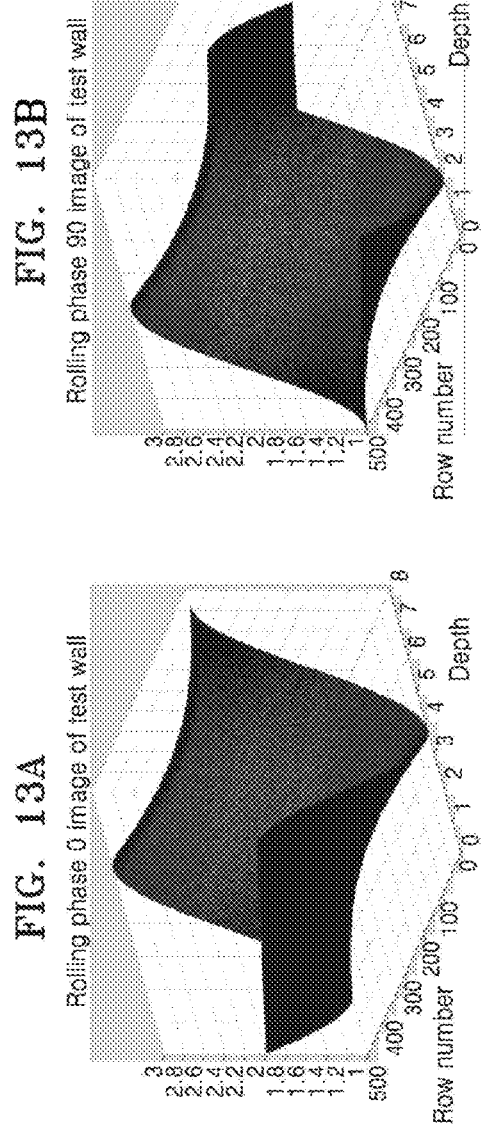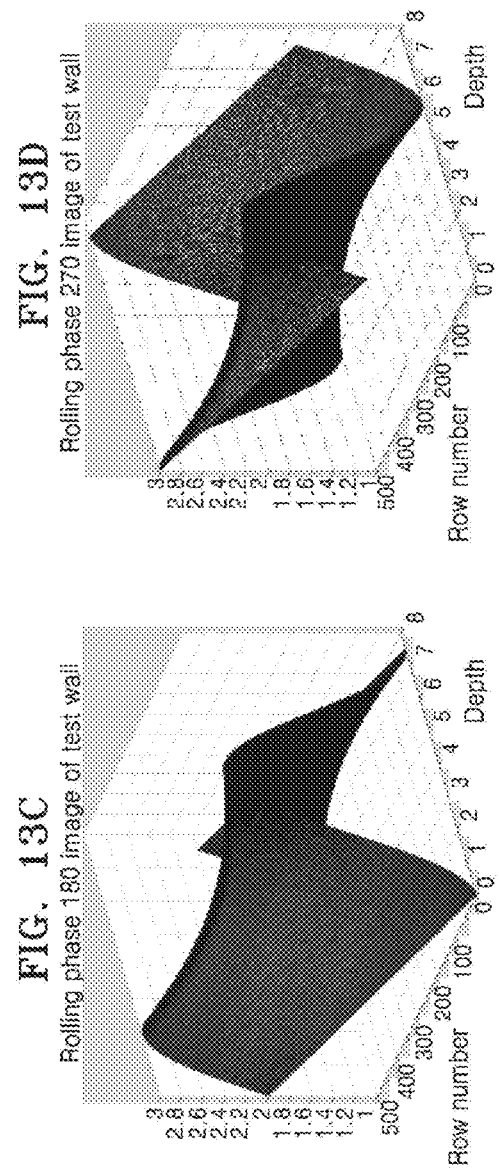

DEPTH IMAGE ACQUISITION APPARATUS AND METHOD OF ACQUIRING DEPTH INFORMATION

CROSS-REFERENCE TO RELATED APPLICATION

This application claims priority to Korean Patent Application No. 10-2014-0114239, filed on Aug. 29, 2014, in the Korean Intellectual Property Office, the disclosure of which is incorporated herein in its entirety by reference.

BACKGROUND

1. Field

Apparatuses and methods consistent with exemplary embodiments relate to depth image acquisition acquiring depth information by using a rolling shutter method.

2. Description of the Related Art

Recently, three-dimensional (3D) cameras or light detection and ranging (LIDAR) techniques for capturing distance information of an object have been researched. One of these research techniques is a time-of-flight (TOF) method that measures a traveling time of light, whereby a distance between an image capturing unit and a subject is measured to generate a depth image.

In the TOF method, light of a predetermined wavelength, for example, near-infrared (NIR) (850 nm), is projected to a subject by using a light-emitting diode (LED) or a laser diode (LD), and light of the same wavelength reflected on the subject is measured or captured by using a photodiode or a camera to thereby extract a depth image. A TOF method may include a series of various optical processes, such as projection of light from a light source, reflection of a subject, optical modulation, capturing, and processing.

For example, an optical shutter method is a method in which light of a predetermined wavelength (e.g., NIR 850 nm) is projected to a subject by using an LED or LD and an optical image obtained from light of the same wavelength reflected on the subject is optically modulated by using an image intensifier or a predetermined solid state modulator. Furthermore, in the optical shutter message, an image is captured by using an image sensor, such as a photodiode (PD), a charge-coupled device (CCD), or a complementary metal oxide semiconductor (CMOS) image sensor (CIS), included at a rear end of the image intensifier or the solid state modulator and an intensity value of the image is processed so as to obtain a depth image.

The CCD is a device in which metal-oxide-silicon (MOS) capacitors are very closely positioned and charge carriers are transferred to and stored in the MOS capacitors. The CIS is a device in which MOS transistors corresponding to the number of pixels are formed by using CMOS technology and a control circuit and a signal processing circuit are used as peripheral circuits. Furthermore, the CIS uses a switching method of detecting outputs in turn by using the MOS transistors.

The CCD has received attention as a leading image sensor and is widely used in digital cameras, camera phones, etc. As the importance of camera phones increases, it is important to reduce the power consumption of camera phones. Thus, there is an increasing interest in the CIS. The reason is because the CIS is manufactured by using CMOS technology, which is used for manufacturing general silicon semiconductor devices, and therefore has a small size, a low price, and low power consumption.

Examples of a method of capturing an optical image of a subject, formed in an image capturing region of an image capturing device, include a global shutter method and a rolling shutter method. The global shutter method is a method in which all pixels in the image capturing region capture an optical image at the same time. On the other hand, the rolling shutter method is a method in which one or several pixels in the image capturing region sequentially capture an optical image.

Both the global shutter method and the rolling shutter method may be applied to a CMOS image capturing device. When the global shutter method is applied to the CMOS image capturing device, a captured image is not transformed even if a subject moves, because all pixels capture an optical image of the subject at the same time. On the other hand, in a CMOS image capturing device using the rolling shutter method, an image may be distorted due to a difference in image capturing time for each scan line because one or several pixels sequentially capture an optical image.

SUMMARY

Provided are methods of acquiring depth information and depth image acquisition apparatuses.

Additional aspects will be set forth in part in the description which follows and, in part, will be apparent from the description, or may be learned by practice of exemplary embodiments.

According to an aspect of an exemplary embodiment, there is provided a method of obtaining depth information, the method including: sequentially projecting, to a subject, N different beams of light emitted from a light source for a time period including an idle time for each of the N different beams of light, where N is a natural number that is equal to or greater than 3; modulating, using a light modulation signal, beams of reflected light that are obtained by reflection of the N different beams of light from the subject; obtaining N phase images corresponding to the N different beams of light by capturing, using a rolling shutter method, the modulated beams of reflected light; and obtaining depth information by using the obtained N phase images.

The idle time may include a readout time for all scan lines using the rolling shutter method.

According to an aspect of another exemplary embodiment, there is provided a method of obtaining depth information, the method including: projecting, to a subject, light emitted from a light source; modulating, by sequentially using N light modulation signals having different phases for a time period including an idle time for each of the N light modulation signals, reflected light that is obtained by reflection of the light from the subject; obtaining N phase images corresponding to the N light modulation signals by capturing, using a rolling shutter method, the modulated reflected light; and obtaining depth information by using the N phase images.

According to an aspect of another exemplary embodiment, there is provided a method of obtaining depth information, the method including: sequentially projecting, to a subject, N beams of light having different phases, where N is a natural number that is equal to or greater than 3; modulating, using a light modulation signal, beams of reflected light that are obtained by reflection of the N beams of light from the subject; reading out N phase images corresponding to the N beams of light by capturing the modulated beams of reflected light with each scan line using a rolling shutter method; with respect to each scan line, obtaining a first relation equation, for each of the N beams of light, among a readout phase image corresponding to an x-th beam of the N beams of light, a readout time for a previous scan line, and a phase image generated from a single beam of light; and obtaining depth information for each scan line by using the obtained N first relation equations, wherein the readout phase image comprises a portion of a phase image generated from the x-th beam of light and a portion of a phase image generated from an (x+1)-th beam of light, according to a readout time for a previous scan line.

The obtaining the depth information may include: obtaining a transformation matrix between the readout phase image and the phase image generated from the single beam of light, based on the N first relation equations; obtaining the phase image generated from the single beam of light by applying, to the readout phase image, an inverse matrix of the obtained transformation matrix; and obtaining a phase delay due to a time of flight (TOF) by using the phase image generated from the single beam of light.

The N beams of light having different phases may have a same amplitude and period, N may be 4, and the different phases may include 0 degrees, 90 degrees, 180 degrees, and 270 degrees.

The obtaining the phase delay due to the TOF may include obtaining the phase delay according to:

$$\phi_{TOF} = \tan^{-1}\left(\frac{-I_{CIS}^{(90)} + I_{CIS}^{(270)}}{I_{CIS}^{(0)} - I_{CIS}^{(180)}}\right),$$

wherein $\phi_{TOF}$ denotes the phase delay due to the TOF, $I_{CIS}^{(0)}$ denotes a phase image generated from light having a phase of 0 degrees, $I_{CIS}^{(90)}$ denotes a phase image generated from light having a phase of 90 degrees, $I_{CIS}^{(180)}$ denotes a phase image generated from light having a phase of 180 degrees, and $I_{CIS}^{(270)}$ denotes a phase image generated from light having a phase of 270 degrees.

The readout phase image may have a form that is expressed by:

$$I_{CIS}^{(\theta)} = r \times A \times \cos(\phi_{TOF} + \theta) + r \times B,$$

wherein $\theta$ denotes a phase of the light, r denotes surface reflectivity of the subject, A denotes a coefficient indicating sizes of the light and the light modulation signal, B denotes a coefficient indicating direct current (DC) components of the light and the light modulation signal, and $\phi_{TOF}$ denotes a phase delay due to a TOF.

The obtaining the depth information may include: obtaining N second relation equations that relate to a difference between the readout phase image corresponding to the x-th beam of the N beams of light and a readout phase image corresponding to the (x+1)-th beam of the N beams of light; and selecting at least two of the N second relation equations and calculating the phase delay according to:

$$\phi_{TOF} = \tan^{-1}\left[\frac{V_i}{U_i}\right],$$

wherein $\phi_{TOF}$ denotes the phase delay due to the TOF, $V_i$ denotes an equation that expresses $\sin \phi_{TOF}$ by the readout N phase images and the readout time by using the N second relation equations, and $U_i$ denotes an equation that expresses $\cos \phi_{TOF}$ by the readout N phase images and the readout time by using the N second relation equations.

The N beams of light having different phases may have a same amplitude and period, N may be 4, and the different phases may include 0 degrees, 90 degrees, 180 degrees, and 270 degrees.

Periods of the N beams of light may be the same as that of the light modulation signal.

The reading out the N phase images may include accumulating the modulated beams of reflected light for a predetermined exposure time with respect to each scan line to read out the N phase images corresponding to the beams of light.

The obtaining the depth information may include: obtaining a phase delay due to a TOF of the reflected light by using the readout N phase images, with respect to each scan line; and obtaining a distance from the subject to a depth image acquisition apparatus, which captures an image of the subject, by using the obtained phase delay.

The method may further include generating a depth image by using the obtained depth information.

According to an aspect of another exemplary embodiment, there is provided a method of obtaining depth information, the method including: projecting, to a subject, light emitted from a light source; modulating, by sequentially using N light modulation signals having different phases, reflected light that is obtained by reflection of the transmitted light from the subject; reading out N phase images corresponding to the N light modulation signals by capturing the modulated reflected light with each scan line using a rolling shutter method; with respect to each scan line, obtaining a first relation equation, for each of the N light modulation signals, among a readout phase image corresponding to an x-th light modulation signal of the N light modulation signals, a readout time for a previous scan line, and a phase image generated from a single light modulation signal; and obtaining depth information for each scan line by using the obtained N first relation equations, wherein the readout phase image comprises a portion of a phase image generated from the x-th light modulation signal and a portion of a phase image generated from an (x+1)-th light modulation signal, according to a readout time for a previous scan line.

According to an aspect of another exemplary embodiment, there is provided a depth image acquisition apparatus including: a light projector configured to sequentially project, to a subject, N different beams of light emitted from a light source for a time period including an idle time for each of the N different beams of light, where N is a natural number that is equal to or greater than 3; a light modulator configured to modulate, using a light modulation signal, beams of reflected light that are obtained by reflection of the N different beams of light from the subject; an image capturer configured to obtain N phase images corresponding to the N different beams of light by capturing, using a rolling shutter method, the modulated beams of reflected light; and a depth image processor configured to obtain depth information by using the obtained N phase images.

According to an aspect of another exemplary embodiment, there is provided a depth image acquisition apparatus including: a light projector configured to sequentially project, to a subject, N beams of light having different phases, where N is a natural number that is equal to or greater than 3; a light modulator configured to modulate, using a light modulation signal, beams of reflected light that are obtained by reflection of the N beams of light from the subject; an image capturer configured to read out N phase images corresponding to the N beams of light by capturing the modulated beams of reflected light with each scan line using a rolling shutter method; and a depth image processor configured to, with respect to each scan line, obtain a first relation equation, for each of the N beams of light, among a readout phase image corresponding to an x-th beam of the N beams of light, a readout time for a previous scan line, and a phase image generated from a single beam of light, and configured to obtain depth information for each scan line by using the obtained N first relation equations, wherein the readout phase image comprises a portion of a phase image generated from the x-th beam of light and a portion of a phase image generated from an (x+1)-th beam of light, according to a readout time for a previous scan line.

The depth image processor may be configured to: obtain a transformation matrix between the readout phase image and the phase image generated from the single beam of light, based on the N first relation equations; obtain the phase image generated from the single beam of light by applying, to the readout phase image, an inverse matrix of the obtained transformation matrix; and obtain a phase delay due to a TOF by using the phase image generated from the single beam of light.

The readout phase image may have a form that is expressed by:

$$I_{CIS}^{(\theta)} = r \times A \times \cos(\phi_{TOF} + \theta) + r \times B,$$

wherein $\theta$ denotes a phase of the light, r denotes surface reflectivity of the subject, A denotes a coefficient indicating the sizes of the light and the light modulation signal, B denotes a coefficient indicating direct current (DC) components of the light and the light modulation signal, and $\phi_{TOF}$ denotes a phase delay due to a TOF.

The depth image processor may be configured to obtain N second relation equations that relate to a difference between the readout phase image corresponding to an x-th beam of the N beams of light and a readout phase image corresponding to the (x+1)-th beam of the N beams of light, and to select at least two of the N second relation equations and calculate a phase delay according to:

$$\phi_{TOF} = \tan^{-1}\left[\frac{V_i}{U_i}\right],$$

wherein $\phi_{TOF}$ denotes the phase delay due to the TOF, $V_i$ denotes an equation that expresses $\sin \phi_{TOF}$ by the readout N phase images and the readout time by using the N second relation equations, and $U_i$ denotes an equation that expresses $\cos \phi_{TOF}$ by the readout N phase images and the readout time by using the N second relation equations.

BRIEF DESCRIPTION OF THE DRAWINGS

These and/or other aspects will become apparent and more readily appreciated from the following description of exemplary embodiments, taken in conjunction with the accompanying drawings in which:

FIGS. 2A through 2D illustrate an operation of generating four different images (i.e., sub-frames) by using an image capturing device after projecting four different light transmission signals from a light source to a subject, according to an exemplary embodiment;

FIGS. 3A through 3D illustrate an operation of generating four different images (i.e., sub-frames) after modulating reflected light by using four different light modulation signals in a light modulator, according to an exemplary embodiment;

FIGS. 7A and 7B are flowcharts of methods of acquiring depth information, according to one or more exemplary embodiments;

FIG. 8B is a diagram illustrating a time chart for explaining an operation of each component of a depth image acquisition apparatus that captures an image based on the rolling shutter method by using the method of FIG. 7B;

FIGS. 13A through 13D are diagrams exemplarily illustrating phase images generated by beams of transmitted light having different phases, with respect to a slanted wall.

DETAILED DESCRIPTION OF EXEMPLARY EMBODIMENTS

Figure 1:
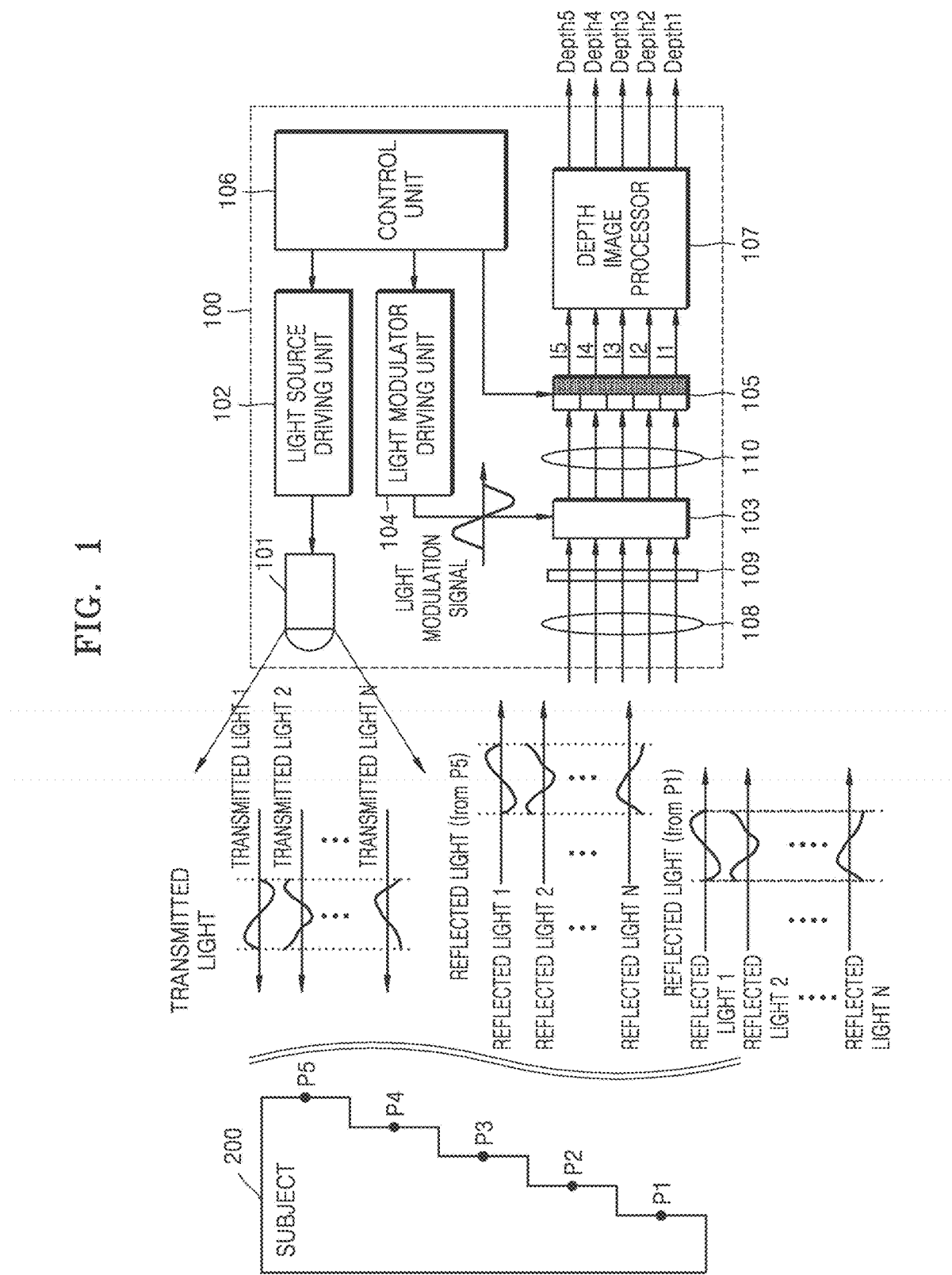
FIG. 1 is a schematic structural diagram illustrating a depth image acquisition apparatus for generating a depth image by using a time-of-flight (TOF) method, according to an exemplary embodiment.

As the inventive concept allows for various changes and numerous embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of exemplary embodiments, certain detailed explanations of related art are omitted when it is deemed that they may unnecessarily obscure the essence of the inventive concept.

While such terms as "first", "second", etc., may be used to describe various components, such components must not be limited to the above terms. The above terms are used only to distinguish one component from another.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

When a component is referred to as being "connected to" another component, it can not only be "directly connected", but also "electrically connected" across an intervening device. Furthermore, when a unit is referred to as "comprising" or "including" a component(s), it does not exclude other components unless stated otherwise and shall be referred to as comprising or including the other components.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, exemplary embodiments are merely described below, by referring to the figures, to explain aspects of the present description. In the description of exemplary embodiments, certain detailed explanations of related art are omitted when it is deemed that they may unnecessarily obscure the disclosure. Like reference numerals denote like elements. As used herein, the term "and/or" includes any and all combinations of one or more of the associated listed items.

FIG. 1 is a schematic structural diagram illustrating a depth image acquisition apparatus 100 for generating a depth image by using a time-of-flight (TOF) method, according to an exemplary embodiment.

Referring to FIG. 1, the depth image acquisition apparatus 100 may include a light source 101 that emits light of a predetermined wavelength, a light source driving unit 102 (e.g., light driver) that drives the light source 101, a light modulator 103 that modulates light reflected by a subject 200 (e.g., an object or a subject for image capturing), a light modulator driving unit 104 (e.g., light modulator driver) that drives the light modulator 103, an image capturing device 105 that generates an image from the light modulated by the light modulator 103, a depth image processor 107 that generates a depth image based on an output of the image capturing device 105, and a control unit 106 (e.g., controller) that controls operations of the light source driving unit 102, the light modulator driving unit 104, the image capturing device 105, and the depth image processor 107. Also, a first lens 108, through which the reflected light is to be focused in an area of the light modulator 103, and a filter 109 that passes through only light having a predetermined wavelength and removes background light or miscellaneous light may be further disposed on a light incident surface of the light modulator 103. In addition, a second lens 110 that focuses the modulated light in an area of the image capturing device 105 may be further disposed between the light modulator 103 and the image capturing device 105.

The light source 101 may be, for example, a light-emitting diode (LED) or a laser diode (LD), which may emit near infrared (NIR) light having a wavelength of about 800 nm to about 1000 nm that is not visible to human eyes, for safety. However, it is understood that one or more other exemplary embodiments are not limited thereto, and the bands of wavelengths and types of light sources may vary. The light source driving unit 102 may drive the light source 101 according to a control signal received from the control unit 106, for example, in an amplitude modulation manner or a phase modulation manner. A light transmission signal that is projected to the subject 200 from the light source 101 may have a periodic continuous function having a predetermined period according to a driving signal of the light source driving unit 102. For example, the light transmission signal may have a waveform that is specifically defined, such as a sine wave, a ramp wave, or a square wave, but may also be a typical, undefined waveform.

The light modulator 103 modulates light reflected by the subject 200 according to a control of the light modulator driving unit 104. The light modulator driving unit 104 drives the light modulator 103 according to a control signal received from the control unit 106. For example, the light modulator 103 may modulate the amplitude of the reflected light by varying a gain of the reflected light according to a light modulation signal having a predetermined wavelength that is provided by the light modulator driving unit 104. To this end, the light modulator 103 has a variable gain. The light modulator 103 may operate at a relatively high light modulation speed of about several tens to several hundreds MHz in order to identify a phase difference or traveling time of light according to distance. The light modulator 103 may be, for example, an image intensifier tube including a multi-channel plate (MCP), a gallium arsenide (GaAs)-based solid state modulator, or a thin-type modulator formed using an electro-optic material. While the light modulator 103 of a transmission type is illustrated in FIG. 1, a reflective-type light modulator may also be used in one or more other exemplary embodiments.

The image capturing device 105 generates an image by detecting the reflected light that is modulated by the light modulator 103 according to a control of the control unit 106. When only a distance to a predetermined point of the subject 200 is to be measured, the image capturing device 105 may be, for example, a single optical sensor, such as a photodiode or an integrator. However, when distances to multiple points on the subject 200 are to be measured at the same time, the image capturing device 105 may have a one- or two-dimensional array including a plurality of photodiodes or other optical detectors. For example, the image capturing device 105 may be a charge-coupled device (CCD) image sensor or a complementary metal oxide semiconductor (CMOS) image sensor (CIS) having a two-dimensional array.

The depth image processor 107 generates a depth image according to a depth image generating algorithm, which will be described below, based on an output of the image capturing device 105. The depth image processor 107 may be, for example, an exclusive integrated circuit (IC), or may be software installed in the depth image acquisition apparatus 100. When the depth image processor 107 is software, the depth image processor 107 may be stored in a separate portable storage medium.

Hereinafter, an operation of the 3D image acquisition apparatus 100 having the above-described structure will be briefly described.

According to an exemplary embodiment, transmitted light or a light transmission signal of the light source 101 is in the form of a function having a predetermined period, such as a sine wave or a square wave, and has different phases. That is, the transmitted light or the light transmission signal may be controlled to have the same waveforms but different phases according to a control signal of the control unit 106. While the transmitted light of the light source 101 formed to have four different phases has been described above, transmitted light of the light source 101 having the same phase and light modulation signals of the light modulator 103 having four different phases may also be formed according to another exemplary embodiment. Here, the description will focus on an exemplary embodiment in which light transmission signals having four different phases are sequentially projected in the order of 0, 180, 90, and 270 degrees.

The light source 101 may sequentially project four different beams of transmitted light having predetermined periods and waveforms to the subject 200 according to a control of the control unit 106 and the light source driving unit 102. For example, transmitted light 1 having a phase that is 0 degrees may be generated and projected to the subject 200 during a first time period, then transmitted light 2 having a phase that is 180 degrees may be generated and projected to the subject 200 during a second time period. Subsequently, transmitted light 3 having a phase that is 90 degrees may be generated and projected to the subject 200 during a third time period, and then transmitted light 4 having a phase that is 270 degrees may be generated and projected to the subject 200 during a fourth time period. The transmitted lights sequentially projected to the subject 200 may be in the form of a continuous function having a predetermined period, such as a sine wave.

After the transmitted light projected to the subject 200 is reflected on a surface of the subject 200, the transmitted light is incident to the first lens 108. The subject 200 may typically have multiple surfaces having different distances from the depth image acquisition apparatus 100, that is, different depths. For simplification of description, the subject 200 illustrated in FIG. 1 has five surfaces P1 to P5 with different depths. As the transmitted light is reflected by each of the five surfaces P1 to P5 having different depths, five reflected light beams that are differently delayed in time according to depth (that is, of different phases) are respectively generated. For example, as the transmitted light 1 is reflected on the five surfaces P1 to P5 of the subject 200, five beams of the reflected light 1 having different phases are generated. Also, as the transmitted light 2 is reflected on the five surfaces P1 to P5 of the subject 200, five beams of the reflected light 2 having different phases are generated. Furthermore, the transmitted light 4 is reflected by the five surfaces P1 to P5 to generate five beams of the reflected light 4 having different phases. The reflected light reflected by the surface P1 that is the farthest from the depth image acquisition apparatus 100 is time-delayed by $\Phi_{P1}$ to arrive at the first lens 108, and the reflected light reflected on the surface P5 that is the closest to the depth image acquisition apparatus 100 is time-delayed by $\Phi_{P5}$, which is less than $\Phi_{P1}$ to arrive at the first lens 108.

The first lens 108 may focus the reflected light in an area of the light modulator 103. The filter 109 that transmits or passes through only light having a predetermined wavelength may be disposed between the first lens 108 and the light modulator 103 to remove background light or miscellaneous light other than light of a used wavelength. For example, when the light source 101 emits light having an NIR wavelength of about 850 nm, the filter 109 may be an IR band pass filter that transmits or passes through the NIR wavelength band of about 850 nm. Accordingly, light incident to the light modulator 103 may mainly be light that is emitted from the light source 101 and reflected by the subject 200. While the filter 109 is disposed between the first lens 108 and the light modulator 103, the positions of the first lens 108 and the filter 109 may be exchanged. For example, NIR light that has first been transmitted through the filter 109 may be focused on the light modulator 103 through the first lens 108.

The light modulator 103 modulates the reflected light to a light modulation signal having a predetermined wavelength. A period of a gain waveform in the light modulator 103 may be the same as a period of a waveform. Referring to FIG. 1, the light modulator 103 may modulate the five beams of reflected light 1 that are respectively reflected by the five surfaces P1 to P5 of the subject 200 and provide the same to the image capturing device 105, and may sequentially modulate the five beams of each of the reflected lights 2 through 5 and provide the same to the image capturing device 105.

Light having an amplitude that is modulated by using the light modulator 103 passes through the second lens 110. Here, a magnification of the light is adjusted and the light is re-focused, and then the light arrives at the image capturing device 105. Accordingly, the modulated light is focused in an area of the image capturing device 105 through the second lens 110. The image capturing device 105 generates an image by receiving the modulated light during an exposure time.

FIGS. 2A through 2D illustrate an operation of generating four different images (i.e., sub-frames) by using an image capturing device 105 after projecting four different light transmission signals from a light source to a subject, according to an exemplary embodiment.

As indicated in FIG. 2A, the image capturing device 105 receives the five beams of the reflected light 1, which are respectively reflected on the five surfaces P1 to P5 of the subject 200 and then modulated, for a predetermined exposure time period to generate an image 1 (CIS image 1). Next, as illustrated in FIG. 2B, the image capturing device 105 receives the five beams of the reflected light 2, which are respectively reflected on the five surfaces P1 to P5 of the subject 200 and then modulated, for a predetermined exposure time period to generate an image 2 (CIS image 2). Finally, by repeating the above operations, as illustrated in FIG. 2C, the image capturing device 105 receives the five beams of the reflected light 4, which are respectively reflected on the five surfaces P1 to P5 of the subject 200 and then modulated, for a predetermined exposure time period to generate an image 4 (CIS image 4). In this manner, as shown in FIG. 2D, four different images may be sequentially obtained. The images 1 through 4 may each be a sub-frame image for generating an image of a frame having depth information. For example, when assuming a period of one frame to be Td, an exposure time in the image capturing device 105 to obtain the four images 1 through 4 may be about Td/4.

Referring to FIG. 2A, in a first sub-frame, the transmitted light 1 projected from the light source 101 to the subject 200 is reflected by the five surfaces P1 to P5 of the subject 200 to generate five beams of the reflected light 1. The five beams of the reflected light 1 are modulated by using the light modulator 103 and then arrive at the image capturing device 105. In FIG. 2A, for convenience of description, the image capturing device 105 includes only five pixels respectively corresponding to the five surfaces P1 to P5, though it is understood that exemplary embodiments are not limited thereto. Accordingly, the five beams of the reflected light 1 may be respectively incident on their corresponding five pixels. As illustrated in FIG. 2A, the five beams of the reflected light 1 respectively reflected on the surfaces P1 to P5 have different phase delays $\Phi P1$ to $\Phi P5$ according to the distance from the depth image acquisition apparatus 100 to the surfaces P1 to P5. For example, the image capturing device 105 may generate an image 1 by capturing the reflected light 1 during an exposure time of about Td/4. In the same manner as described above, as illustrated in FIGS. 2B and 2C, different phase delays ΦP1 to ΦP5 are generated on the five surfaces P1 to P5 with different depths from a second sub-frame to a fourth sub-frame.

While four different light transmission signals are transmitted to a subject and four different images (i.e., sub-frames) are generated by using an image capturing device 105 in FIGS. 2A through 2D, identical transmission light may be used in each sub-frame and the light modulator 103 may modulate reflected light to different gain waveforms for each of the sub-frames in one or more other exemplary embodiments.

FIGS. 3A through 3D illustrate an operation of generating four different images (i.e., sub-frames) after modulating the reflected light by using four different light modulation signals in the light modulator 103, according to an exemplary embodiment.

Here, the description will focus on an exemplary embodiment in which light modulation signals having four different phases are sequentially used in the order of 0, 180, 90, and 270 degrees.

Referring to FIGS. 3A through 3D, the reflected light reflected by the subject 200 has the same waveform and phase in each sub-frame. There are five different phase delays ΦP1 to ΦP5 in the reflected light of each sub-frame according to the surfaces P1 to P5 of the subject 200 as described above.

As illustrated in FIGS. 3A through 3C, in the first sub-frame, the light modulator 103 modulates the reflected light by using a light modulation signal 1 (0 degrees), and in the second sub-frame, the light modulator 103 modulates the reflected light by using a light modulation signal 2 (180 degrees) having a different phase from that of the light modulation signal 1. In the third sub-frame, the light modulator 103 modulates the reflected light to a light modulation signal 3 (90 degrees) having another different phase, and in the fourth sub-frame, the light modulator 103 modulates the reflected light to another light modulation signal 4 (270 degrees). Here, the light modulation signals 1 through 4 are signals having different phases of 0, 180, 90, and 270 degrees. Also, the light modulation signals 1 through 4 may have the same periods and waveforms. Then, as illustrated in FIG. 3D, four different images 1 through 4 may be obtained.

In FIGS. 2A through 2D and 3A through 3D, while the modulated images are labeled as CIS images 1 through 4, as described above, the image capturing device 105 is not limited to a CIS in one or more other exemplary embodiments.

The four images, obtained by projecting the light transmission signals having different phases (0, 180, 90, and 270 degrees) as illustrated in FIG. 2 or by using the light modulation signals 1 through 4 having different phases (0, 180, 90, and 270 degrees) as illustrated in FIG. 3, are transmitted to the depth image processor 107. The depth image processor 107 generates a depth image or depth information according to a method which will be described below, based on the four images.

Figure 4:
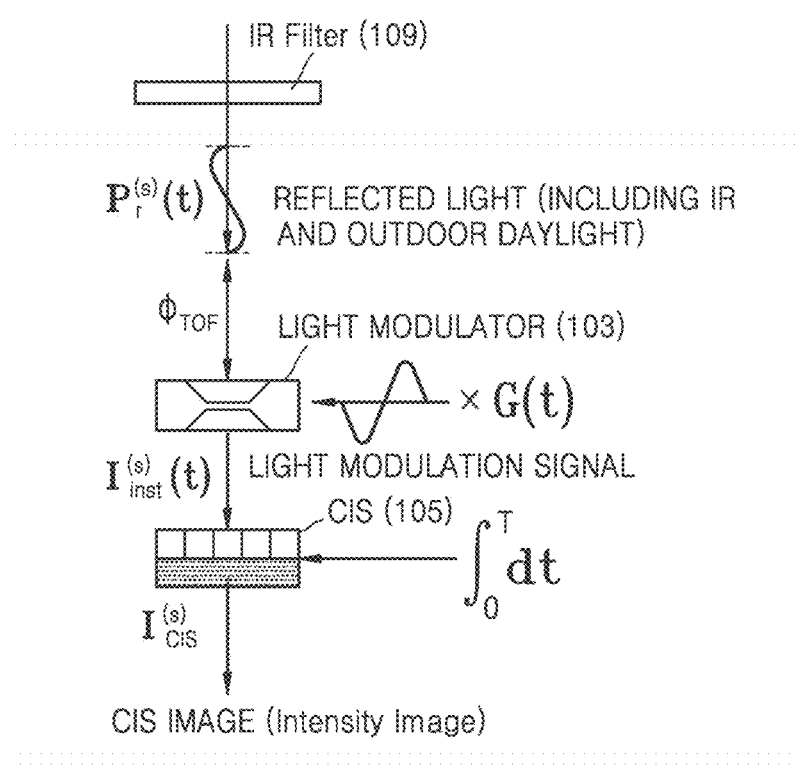
FIG. 4 illustrates a flow of an optical process according to an exemplary embodiment.
Figure 5A:
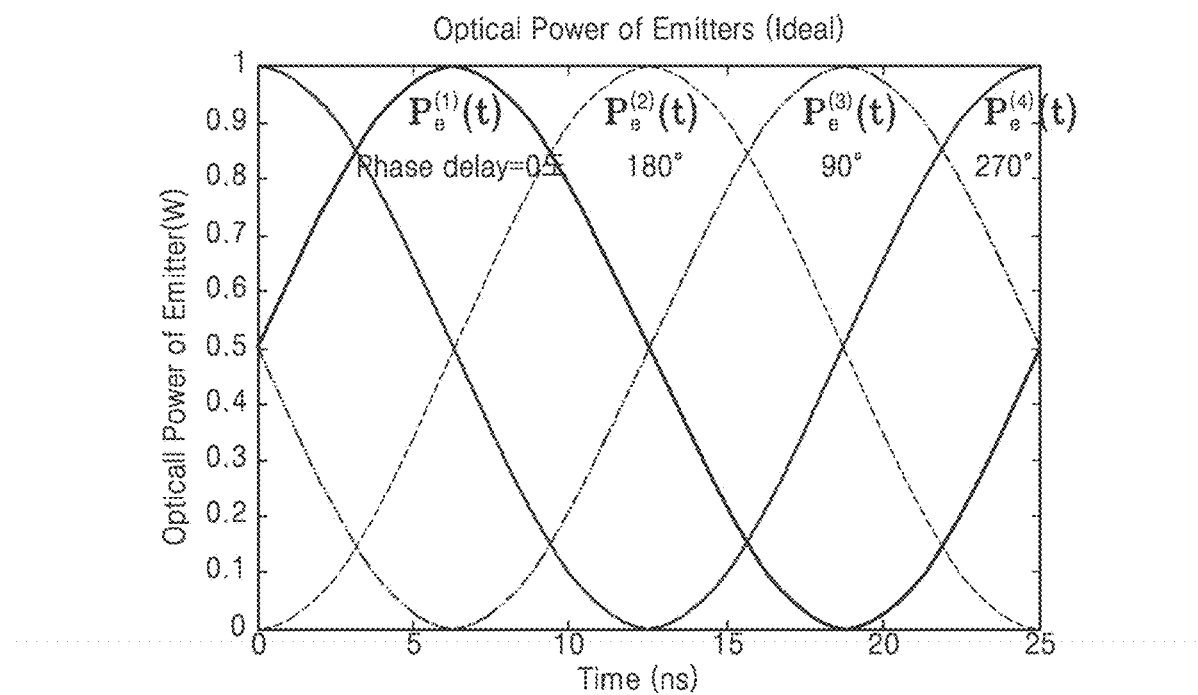
FIGS. 5A and 5B are graphs for explaining an output waveform of a light source and an output waveform of a light modulator, according to an exemplary embodiment.
Figure 5B:
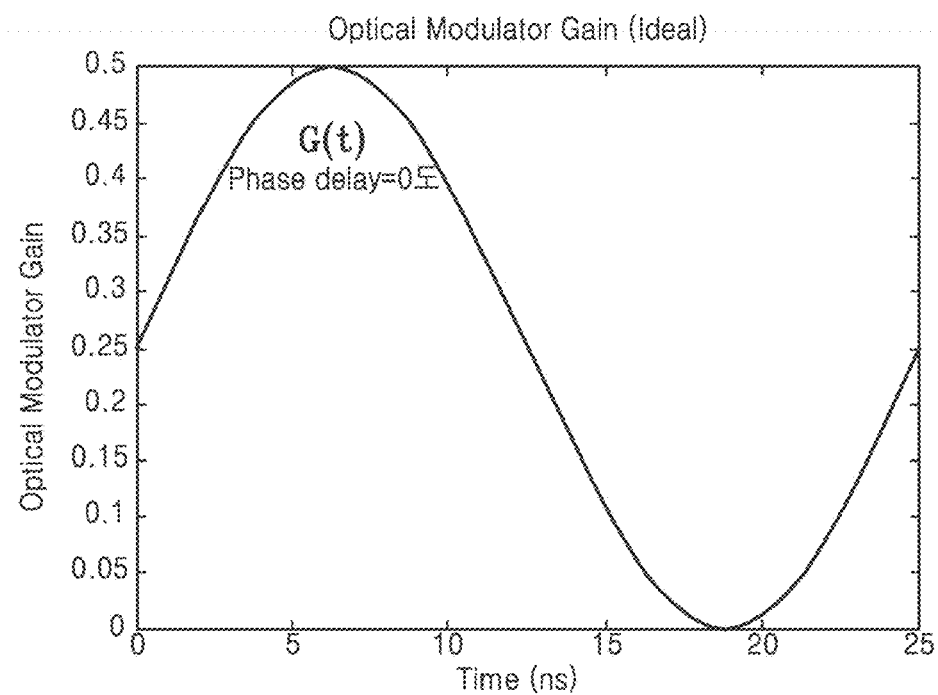

FIG. 4 illustrates a flow of an optical process according to an exemplary embodiment, and FIGS. 5A and 5B are graphs for explaining an output waveform of a light source and an output waveform of a light modulator, according to an exemplary embodiment.

Referring to FIGS. 4, 5A, and 5B, an optical processing operation of infrared light in the depth image acquisition apparatus 100 according to an exemplary embodiment is illustrated. Infrared light that has transmitted or passed through an IR filter (e.g., a central wavelength of 850 nm) may arrive at the light modulator 103 and may be modulated to arrive at the image capturing device 105 at a rear end of the 3D image acquisition apparatus 100. This series of optical processes are developed as described below.

FIG. 5A is a waveform diagram of a light output waveform, and FIG. 5B is a driving waveform diagram of a light modulator. The waveform may be various periodic waves, such as a sine wave, a square wave, or a ramp wave. For convenience of description, a formula for an exemplary embodiment where a light output wave (light transmission signal) is a square wave and a driving waveform of a light modulator is a sine wave will be exemplified.

An infrared light output (or light transmission signal) is a square wave form, and emitting light optical power may be defined as expressed in Equation 4 below.

$$P_e^{(s)}(t) = a \cdot \text{rect}(\omega t - \theta^{(s)}) + \overline{P}_{ave}, \ s=1,2,\ldots,4 \quad \text{[Equation 4]}$$

Here, "a" denotes the size of a square waveform component, "s" denotes the transmission order of different beams of transmitted light, and $\overline{P}_{ave}$ denotes DC offset, which is a DC component of output light. The different beams of transmitted light, which are sequentially transmitted, respectively have phases of 0 degrees, 180 degrees, 90 degrees, and 270 degrees in the present exemplary embodiment.

Reflected light that has transmitted or passed through an IR filter may be expressed as in Equation 5.

$$P_r^{(s)}(t) = r[a \cdot \text{rect}(\omega t - \theta^{(s)} - \phi_{TOF}) + \overline{P}_{ave}] + r\overline{P}_a \quad \text{[Equation 5]}$$

The reflected light returns after being reflected on a surface of a subject, and thus, is in the form of a square of reflectivity r in which surface reflectivity of the subject, a lens size, or the like may be comprehensively considered. In the reflected light, a phase difference due to a TOF method is present and external light is also present like the infrared light.

A modulation waveform (gain) or a light modulation signal of a light modulator (optical shutter) may be as expressed in Equation 6 below.

$$G(t) = c \sin(\omega t) + \overline{G}_{ave} \quad \text{[Equation 6]}$$

The light modulation signal is in the form of a combination of a sine wave (AC component) and a DC component. Here, c denotes the size of a sine wave component, and $\overline{G}_{ave}$ denotes DC offset which is a DC component of output light.

An optical signal arriving at the image capturing device is a signal obtained by multiplying the reflected light and the light modulation signal and may be as expressed in Equation 7 below.

$$I_{inst.}^{(s)}(t) = P_r^{(s)}(t) \times G(t) = r[a \cdot \text{rect}(\omega t - \theta^{(s)} - \phi_{TOF}) + (\overline{P}_{ave} + \overline{P}_a)] \times [c \sin(\omega t) + \overline{G}_{ave}] \ s=1,2,\ldots,4 \quad \text{[Equation 7]}$$

An output signal (or output image) emitted from the image capturing device is in the form obtained by integrating the optical signal of Equation 7 and may be as expressed in Equation 8 below.

$$\begin{aligned} I_{CIS}^{(s)} &\equiv \frac{1}{T}\int_0^T I_{inst.}^{(s)}(t)\,dt \\ &= \frac{rac}{2\pi}\left[\int_{\theta^{(s)}+\phi_{TOF}}^{\theta^{(s)}+\phi_{TOF}+\pi}(1)\cdot\sin\omega t\,d\omega t + \int_{\theta^{(s)}+\phi_{TOF}+\pi}^{\theta^{(s)}+\phi_{TOF}+2\pi}(-1)\cdot\sin\omega t\,d\omega t\right] + \\ &\quad r(\overline{P}_{ave}+\overline{P}_a)\overline{G}_{ave} \end{aligned}$$

[Equation 8]

-continued $$= \frac{rac}{2\pi}[-\cos(\theta^{(s)} + \phi_{TOF} + \pi) +$$

$$\cos(\theta^{(s)} + \phi_{TOF}) + \cos(\theta^{(s)} + \phi_{TOF} + 2\pi) -$$

$$\cos(\theta^{(s)} + \phi_{TOF} + \pi)] + r(\overline{P}_{ave} + \overline{P}_a)\overline{G}_{ave}$$

$$= \frac{rac}{\pi}[-\cos(\theta^{(s)} + \phi_{TOF} + \pi) + \cos(\theta^{(s)} +$$

$$\phi_{TOF})] + r(\overline{P}_{ave} + \overline{P}_a)\overline{G}_{ave}$$

$$= r \cdot \frac{2}{\pi} \cdot ac \cdot \cos(\theta^{(s)} + \phi_{TOF}) + r \cdot (\overline{P}_{ave} + \overline{P}_a)\overline{G}_{ave}$$

$$= rA \cdot \cos(\theta^{(s)} + \phi_{TOF}) + rB \quad s = 1, 2, \ldots, 4$$

Four images sequentially captured to correspond to beams of transmitted light having different phases, based on Equation 8, may be as expressed in Equations 9 through 12 below.

$$I_{CIS}^{(0)} = rA \cos \phi_{TOF} + rB \quad \text{[Equation 9]}$$

$$I_{CIS}^{(180)} = -rA \cos \phi_{TOF} + rB \quad \text{[Equation 10]}$$

$$I_{CIS}^{(90)} = -rA \sin \phi_{TOF} + rB \quad \text{[Equation 11]}$$

$$I_{CIS}^{(270)} = rA \sin \phi_{TOF} + rB \quad \text{[Equation 12]}$$

Here, "A" and "B" may be as expressed in Equation 13 below.

$$A = \frac{2}{\pi} \cdot ac, \; B = (\overline{P}_{ave} + \overline{P}_a)\overline{G}_{ave} \quad \text{[Equation 13]}$$

Even when an output waveform or a light transmission signal of a light source is a sine wave instead of a square wave, formulas may also be developed like the above formulas, and just "A" has a different result as expressed in Equation 14 below.

$$A' = \tfrac{1}{2} \cdot ac \quad \text{[Equation 14]}$$

With respect to the four images of Equations 9 through 12, when unknown figures r, A, and B are removed to solve the formulas for a phase delay ($\Phi_{TOF}$), a phase delay due to a depth as in Equation 1 may be calculated.

In addition, a depth from a subject to the depth image acquisition apparatus 100 capturing an image of the subject may be acquired as in Equation 15 by using the phase delay.

$$\text{depth} = \frac{c}{4\pi f}\tan^{-1}\left(\frac{-I_{CIS}^{(90)} + I_{CIS}^{(270)}}{I_{CIS}^{(0)} - I_{CIS}^{(180)}}\right) \quad \text{[Equation 15]}$$

Here, "c" denotes the speed of light, "f" denotes the frequency of transmitted light, $I_{CIS}^{(0)}$ denotes a phase image that is generated from transmitted light having a phase of 0 degrees, $I_{CIS}^{(90)}$ denotes a phase image that is generated from transmitted light having a phase of 90 degrees, $I_{CIS}^{(180)}$ denotes a phase image that is generated from transmitted light having a phase of 180 degrees, and $I_{CIS}^{(270)}$ denotes a phase image that is generated from transmitted light having a phase of 270 degrees.

In Equations 9 through 15, it is assumed that a depth image is generated by using a global shutter method. That is, Equations 9 through 15 do not reflect distortion that occurs due to a difference in image capturing time for each scan line of pixels when a rolling shutter method is used. Equations 9 through 15 are used for improving distortion that occurs due to a difference in image capturing time for each scan line when a depth image is captured by using the rolling shutter method.

Figure 6A:
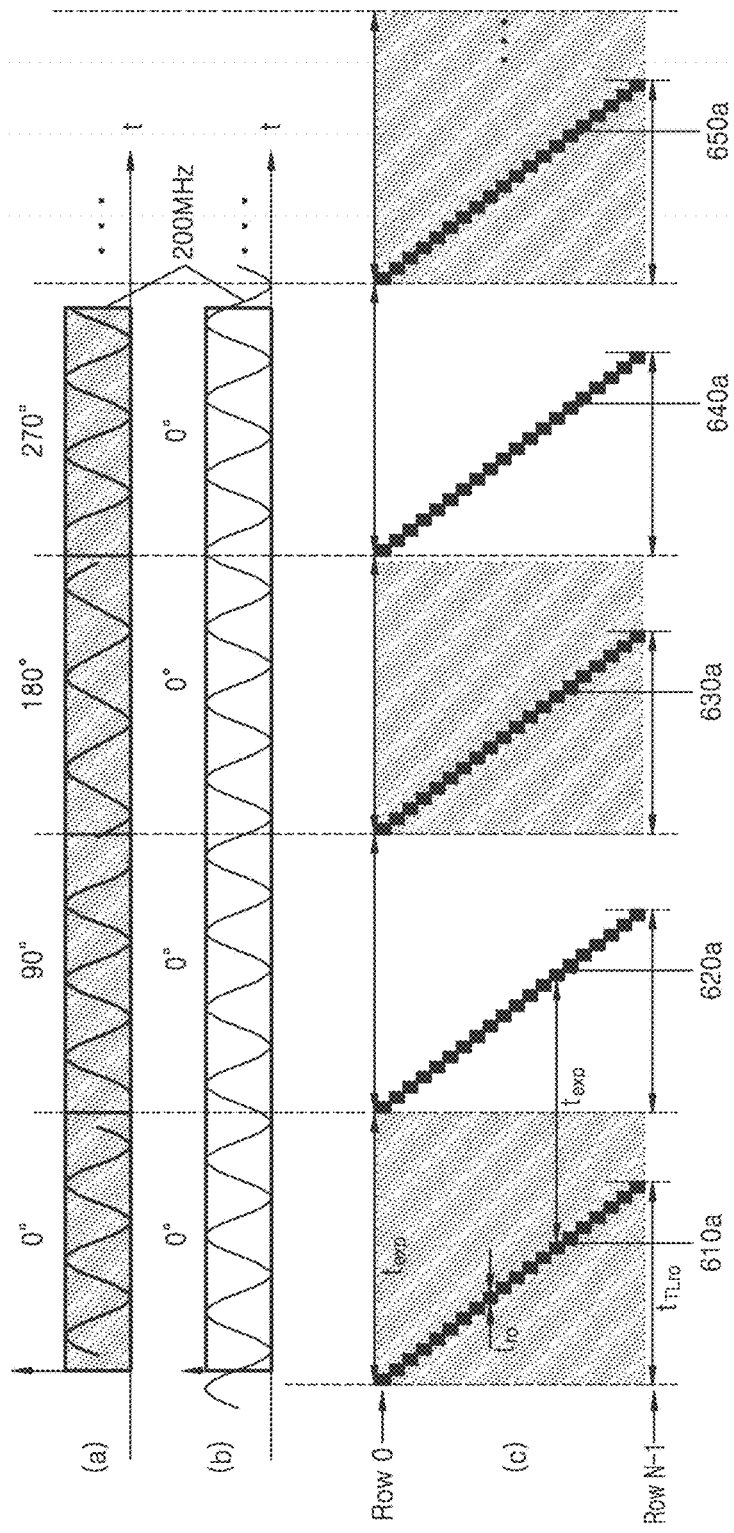
FIGS. 6A and 6B are diagrams illustrating time charts for explaining operations of each component of a depth image acquisition apparatus that captures an image based on a rolling shutter method, according to an exemplary embodiment.
Figure 6B:
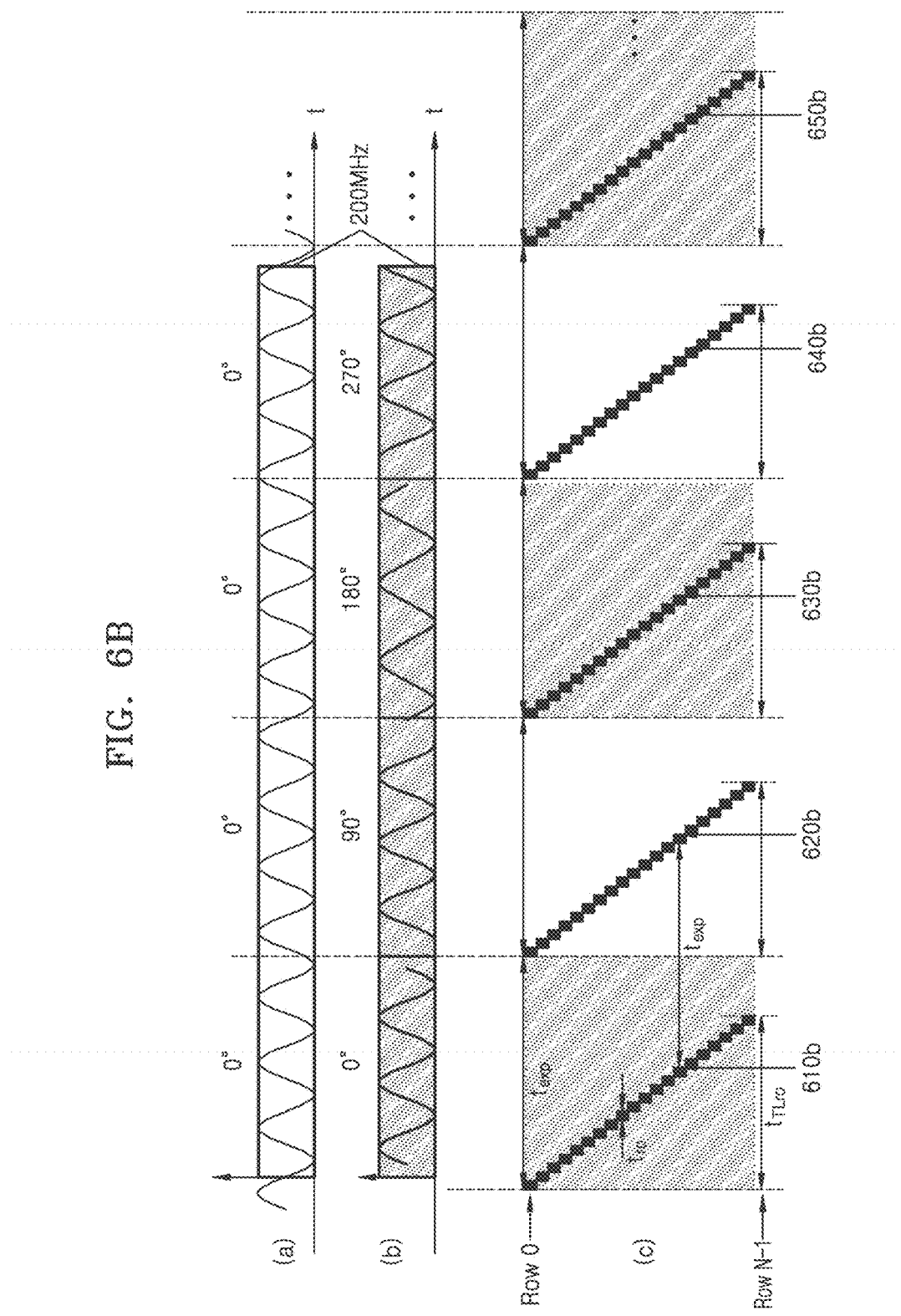

FIGS. 6A and 6B are diagrams illustrating time charts for explaining operations of each component of a depth image acquisition apparatus that captures an image based on a rolling shutter method, according to an exemplary embodiment.

A three-dimensional sensor using the TOF method, i.e., a depth camera, sequentially obtains phase images having at least three phases by using driving signals having different phases, and thus generates a depth image.

FIG. 6A is a diagram illustrating a time chart for explaining an operation of each component of a depth image acquisition apparatus that captures an image based on the rolling shutter method by projecting beams of transmitted light having different phases.

(a) of FIG. 6A shows transmitted light. That is, the light source 101 may sequentially project beams of transmitted light having four different phases to a subject at regular time intervals. A case, in which the beams of the transmitted light may have the same amplitude and the same period and phases of the beams of the transmitted light include 0 degrees, 90 degrees, 180 degrees, and 270 degrees, is exemplarily described.

(b) of FIG. 6A shows a light modulation signal. The light modulation signal has a constant amplitude and a constant period and may have the same frequency as the transmitted light.

(c) of FIG. 6A shows an operation in which the image capturing device 105 receives modulated light for a predetermined exposure time $t_{exp}$ by using the rolling shutter method, generates an image, and reads out the image.

The rolling shutter method is one of the methods of capturing a depth image by using a CIS. According to the rolling shutter method, readouts are sequentially performed on scan lines of an image formed in a two-dimensional matrix form. For example, the CIS sequentially reads out, from an uppermost row to a lowermost row, an image formed in the two-dimensional matrix form.

When a time for extracting an image for a scan line, e.g., a row, to store the image in an external storage device is referred to as a readout time $t_{ro}$, a next scan line is read after a lapse of time (i.e., $t_{ro}$) for reading the scan line. Accordingly, a time for reading all scan lines of an image may be as expressed in Equation 16.

$$t_{TLro} = N \times t_{ro} \quad \text{[Equation 16]}$$

Here, "N" denotes the number of total scan lines, and $t_{ro}$ denotes a time for reading one scan line.

That is, since a time difference corresponding to a readout time $t_{TLro}$ for reading all scan lines is between a time zone for capturing an image of a first scan line and a time zone for capturing an image of a last scan line, a final depth image is an image that is obtained by capturing images at different time zones for each scan line.

When a phase image is captured by using the rolling shutter method to generate a depth image, a phenomenon occurs in which a phase image generated from beams of transmitted light having different phases is included in a phase image for each scan line other than a first scan line. For example, the image capturing device 105 receives a portion of a phase image generated from transmitted light having a phase of 0 degrees and a portion of a phase image generated from transmitted light having a phase of 90 degrees for a predetermined exposure time $t_{exp}$ and reads out a phase image corresponding to the transmitted light having a phase of 0 degrees. In the case of a first scan line, a readout time for a scan line immediately before the first scan line does not exist. Thus, a readout phase image corresponding to an x-th transmitted light (e.g., transmitted light having a phase of 0 degrees) is identical to a phase image generated from the x-th transmitted light. In the case of a second scan line, the exposure time $t_{exp}$ is delayed by a readout time $t_{ro}$ for a scan line immediately before the second scan line. Accordingly, a readout phase image corresponding to the x-th transmitted light includes a portion of a phase image generated from the x-th transmitted light and a portion of a phase image generated from an (x+1)-th transmitted light (e.g., transmitted light having a phase of 90 degrees).

As a readout phase image includes phase images generated from beams of transmitted light having different phases, a generated depth image may be distorted. Aspects of one or more exemplary embodiments may solve the above problem in which, in the case of using the rolling shutter method, a generated depth image is distorted since a phase image read-out from each scan line includes phase images generated from beams of transmitted light having different phases.

FIG. 6B is a diagram illustrating a time chart for explaining an operation of each component of a depth image acquisition apparatus that captures an image based on the rolling shutter method by using light modulation signals having different phases.

(a) of FIG. 6B shows transmitted light. The light source 101 may project, to a subject, beams of transmitted light having a constant amplitude, a constant period, and the same phase.

(b) of FIG. 6B shows a light modulation signal. The light modulation signal may include N light modulation signals that have a constant amplitude and period, have the same frequency as the transmitted light, and have different phases from each other. A case, in which phases of each of the N light modulation signals are 0 degrees, 90 degrees, 180 degrees, and 270 degrees, is exemplarily described.

(c) of FIG. 6B shows an operation in which the image capturing device 105 receives modulated light for a predetermined exposure time $t_{exp}$ by using the rolling shutter method, generates an image, and reads out the image.

When a phase image is captured by using the rolling shutter method to generate a depth image, a phenomenon occurs in which a phase image generated by using light modulation signals having different phases is included in a phase image for each scan line other than a first scan line. For example, the image capturing device 105 receives a portion of a phase image generated by using a light modulation signal having a phase of 0 degrees and a portion of a phase image generated by using a light modulation signal having a phase of 90 degrees for a predetermined exposure time $t_{exp}$ and reads out a phase image corresponding to the light modulation signal having a phase of 0 degrees. In the case of a first scan line, a readout time for a scan line immediately before the first scan line does not exist. Thus, a readout phase image corresponding to an x-th light modulation signal (e.g., light modulation signal having a phase of 0 degrees) is identical to a phase image generated by using the x-th light modulation signal. In the case of a second scan line, the exposure time $t_{exp}$ is delayed by a readout time $t_{ro}$ for a scan line immediately before the second scan line. Accordingly, a readout phase image corresponding to the x-th light modulation signal includes a portion of a phase image generated by using the x-th light modulation signal and a portion of a phase image generated by using an (x+1)-th light modulation signal (e.g., light modulation signal having a phase of 90 degrees).

As a readout phase image includes phase images generated by using light modulation signals having different phases, a generated depth image may be distorted. Aspects of one or more exemplary embodiments may solve the above problem in which, in the case of using the rolling shutter method, a generated depth image is distorted since a phase image read-out from each scan line includes phase images generated from light modulation signals having different phases.

Figure 7A:
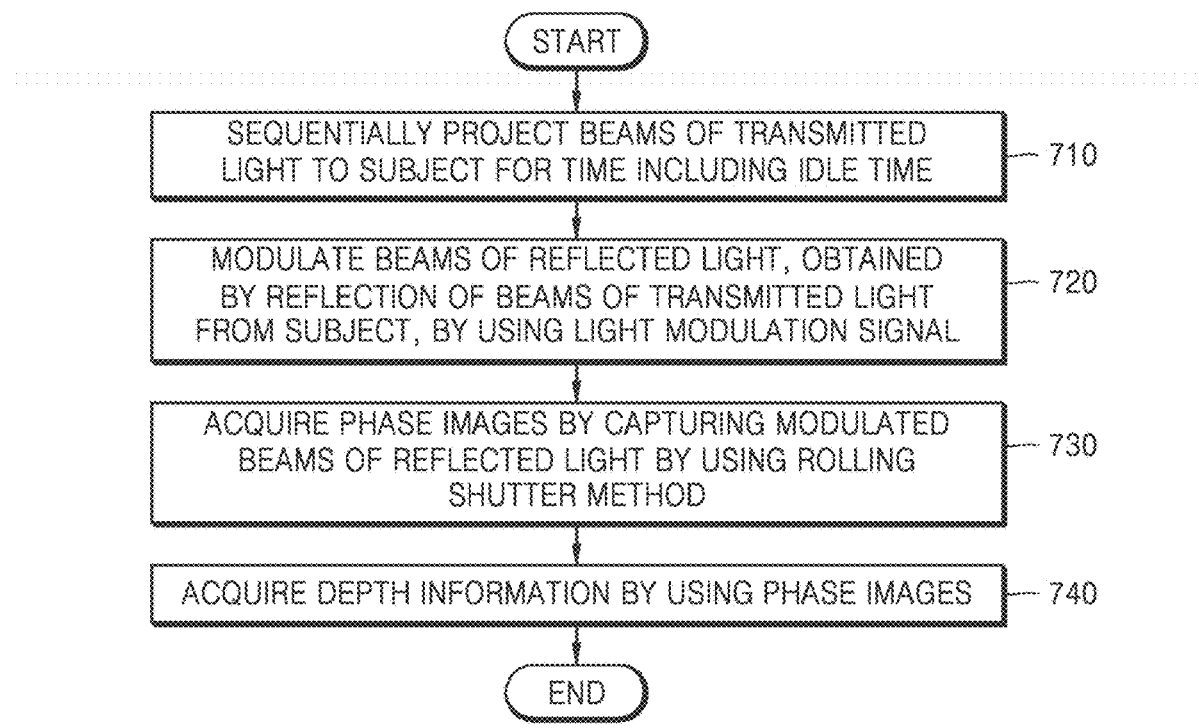

FIGS. 7A and 7B are flowcharts of methods of acquiring depth information, according to one or more exemplary embodiments.

FIG. 7A is a flowchart of a method of acquiring depth information by projecting beams of transmitted light having different phases, according to an exemplary embodiment.

The problem described with reference to FIG. 6A may be solved by sequentially projecting different beams of transmitted light to a subject for a time including an idle time.

In operation 710, the depth image acquisition apparatus 100 sequentially projects N different beams of transmitted light generated from a light source to a subject for a time (i.e., time period or predetermined time period) including an idle time for each of the N different beams of transmitted light (where N is a natural number that is equal to or greater than 3).

The idle time may include a readout time for all scan lines.

In operation 720, the depth image acquisition apparatus 100 modulates beams of reflected light, obtained by reflection of the N different beams of transmitted light from the subject, by using a light modulation signal.

In operation 730, the depth image acquisition apparatus 100 acquires N phase images corresponding to the N different beams of transmitted light by capturing the modulated beams of reflected light using the rolling shutter method.

The depth image acquisition apparatus 100 may accumulate the modulated beams of reflected light for a predetermined exposure time with respect to each scan line and read out the N phase images corresponding to the N different beams of transmitted light.

In operation 740, the depth image acquisition apparatus 100 acquires depth information by using the N phase images.

The depth image acquisition apparatus 100 may acquire a phase delay due to a TOF of reflected light by using N readout phase images, with respect to each scan line. The depth image acquisition apparatus 100 may acquire a distance from a subject to the depth image acquisition apparatus 100, which captures an image of the subject, by using the acquired phase delay.

Also, the depth image acquisition apparatus 100 may generate a depth image by using the acquired depth information and display the depth image.

That is, by further projecting transmitted light for a time including an idle time, a phase image read out with respect to each scan line includes only a phase image generated from a single beam of transmitted light. Accordingly, according to the depth information acquisition method of FIG. 7A, a problem, in which a phase image read out with respect to each scan line includes phase images generated from beams of transmitted light having different phases, may be mitigated or resolved.

FIG. 7B is a flowchart of a method of acquiring (i.e., obtaining) depth information by using light modulation signals having different phases, according to an exemplary embodiment.

The problem described with reference to FIG. 6B may be solved by sequentially using different light modulation signals for a time including an idle time.

In operation 750, the depth image acquisition apparatus 100 sequentially projects, to a subject, beams of transmitted light having a constant amplitude, a constant period, and the same phase, which are generated from a light source.

In operation 760, the depth image acquisition apparatus 100 modulates beams of reflected light, obtained by reflection of the beams of transmitted light from the subject, by sequentially using N different light modulation signals for a time including an idle time for each of the N different light modulation signals (where N is a natural number that is equal to or greater than 3).

The idle time may include a readout time for all scan lines.

In operation 770, the depth image acquisition apparatus 100 acquires (i.e., obtains) N phase images corresponding to the beams of transmitted light by capturing the modulated beams of reflected light using the rolling shutter method.

In operation 780, the depth image acquisition apparatus 100 acquires depth information by using the N phase images.

Operations 770 and 780 of FIG. 7B correspond to operations 730 and 740 of FIG. 7A, and thus, repeated descriptions thereof are omitted.

By modulating light modulation signals having different phases for a time including an idle time for each of the light modulation signals, a phase image read out with respect to each scan line includes only a phase image generated from a single light modulation signal. Accordingly, according to the depth information acquisition method of FIG. 7B, a problem, in which a phase image read out with respect to each scan line includes phase images generated from light modulation signals having different phases, may be mitigated or resolved.

Figure 8A:
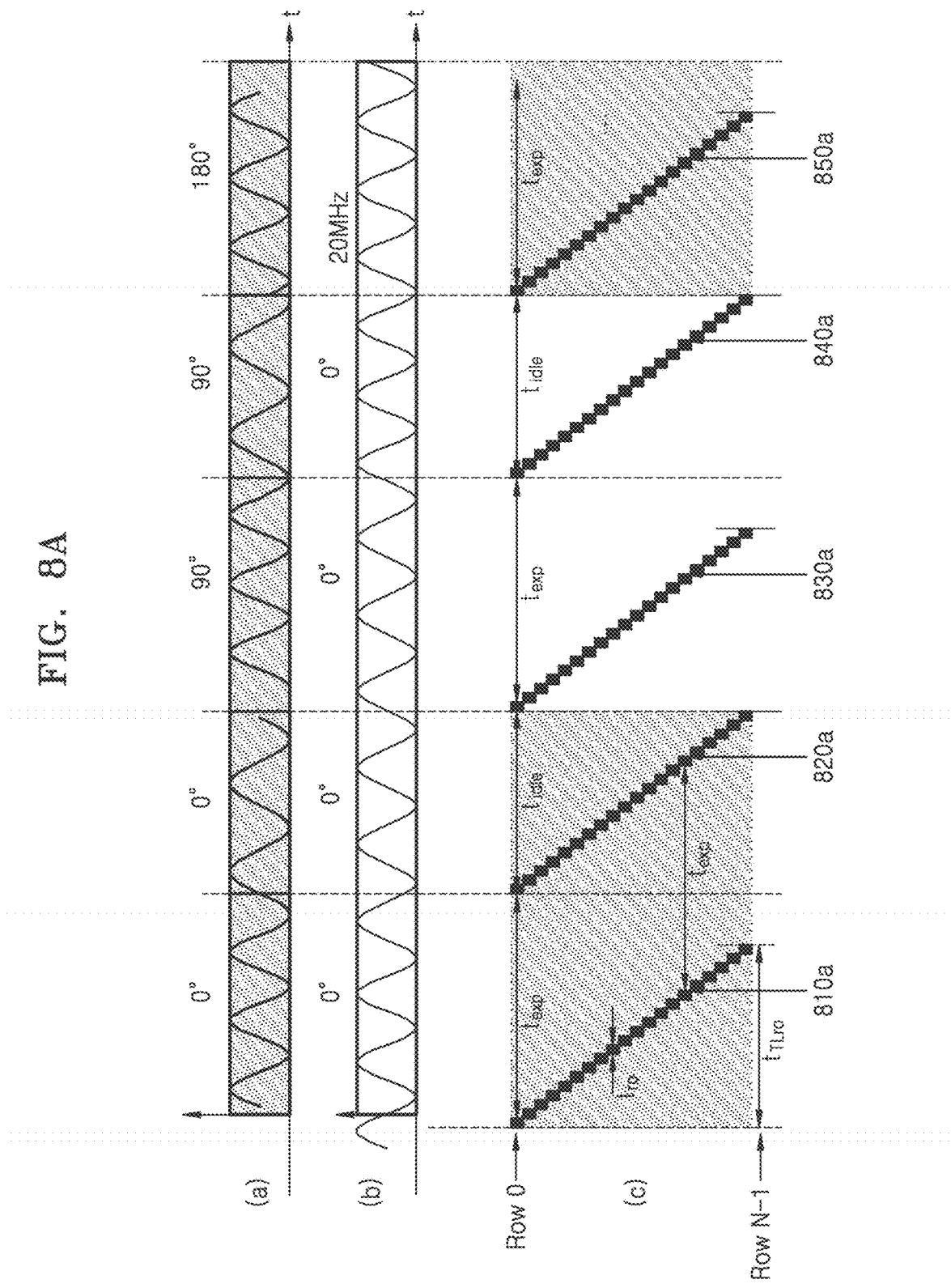
FIG. 8A is a diagram illustrating a time chart for explaining an operation of each component of a depth image acquisition apparatus that captures an image based on the rolling shutter method by using the method of FIG. 7A.

FIG. 8A is a diagram illustrating a time chart for explaining an operation of each component of a depth image acquisition apparatus that captures an image based on the rolling shutter method by using the method of FIG. 7A.

(a) of FIG. 8A shows transmitted light. That is, the light source 101 may sequentially project beams of transmitted light having four different phases to a subject at regular time intervals.

The depth image acquisition apparatus 100 may increase a projection time for each beam of transmitted light having different phases. That is, the depth image acquisition apparatus 100 may insert an idle time in the projection time, to sequentially project the beams of transmitted light. In this case, the idle time may be equal to or greater than a readout time for all scan lines.

(b) of FIG. 8A shows a light modulation signal. The light modulation signal has a constant amplitude and a constant period and may have the same frequency as the transmitted light.

(c) of FIG. 8A shows an operation in which the image capturing device 105 receives modulated light for a predetermined exposure time $t_{exp}$ by using the rolling shutter method, generates an image, and reads out the image.

For example, the image capturing device 105 receives a phase image generated from transmitted light having a single phase of 0 degrees for a predetermined exposure time $t_{exp}$ and reads out a phase image corresponding to the transmitted light having a single phase of 0 degrees. That is, according to a method of an exemplary embodiment, a readout phase image includes only a phase image generated from transmitted light having a single phase by extending a projection time for each beam of transmitted light having different phases. Accordingly, a problem, in which a phase image read out with respect to each scan line includes phase images generated from beams of transmitted light having different phases, may be solved.

However, in this case, a time for acquiring N phase images generated from N beams of transmitted light having different phases increases by N times an added idle time. That is, as a time for acquiring each phase image increases, a frame rate decreases. In addition, power consumption by the depth image acquisition apparatus 100 increases.

FIG. 8B is a diagram illustrating a time chart for explaining an operation of each component of a depth image acquisition apparatus that captures an image based on the rolling shutter method by using the method of FIG. 7B.

(a) of FIG. 8B shows transmitted light. The light source 101 may project beams of transmitted light having a constant amplitude, a constant period, and the same phase to a subject.

(b) of FIG. 8B shows a light modulation signal. The light modulation signal may include N light modulation signals that have a constant amplitude and period, have the same frequency as the transmitted light, and have different phases from each other. A case, in which phases of each of the N light modulation signals are 0 degrees, 90 degrees, 180 degrees, and 270 degrees, is exemplarily described.

(c) of FIG. 8B shows an operation in which the image capturing device 105 receives modulated light for a predetermined exposure time $t_{exp}$ by using the rolling shutter method, generates an image, and reads out the image.

For example, the image capturing device 105 receives a phase image generated from transmitted light having a single phase of 0 degrees for a predetermined exposure time $t_{exp}$ and reads out a phase image corresponding to a light modulation signal having a phase of 0 degrees. That is, according to a method of an exemplary embodiment, a readout phase image includes only a phase image generated from a light modulation signal having a single phase by extending a light modulation time for each of light modulation signals having different phases. Accordingly, a problem, in which a phase image read out with respect to each scan line includes phase images generated from light modulation signals having different phases, may be solved.

However, in this case, a time for acquiring N phase images generated from N light modulation signals having different phases increases by N times an added idle time. That is, as a time for acquiring each phase image increases, a frame rate decreases. In addition, power consumption by the depth image acquisition apparatus 100 increases.

Figure 9A:
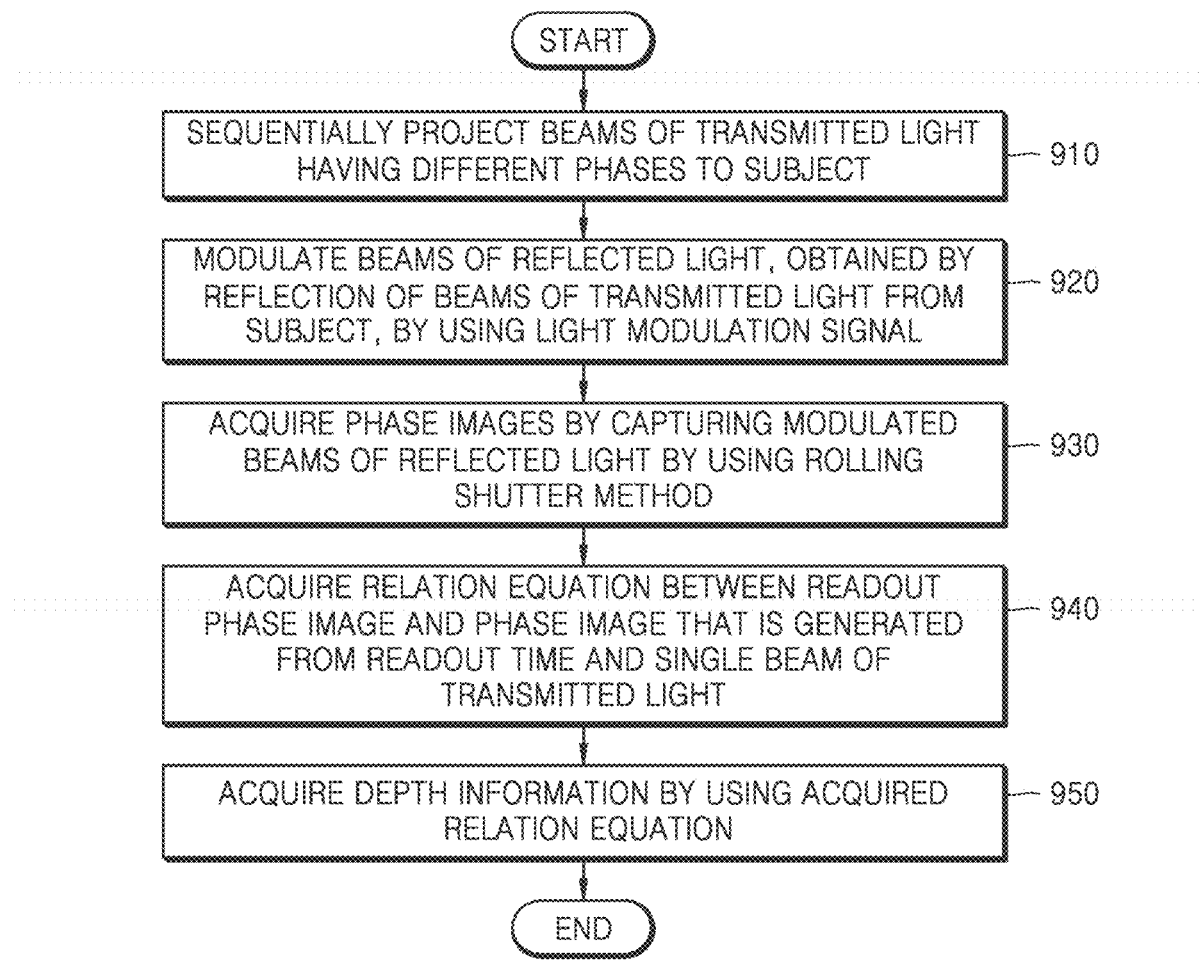
FIGS. 9A and 9B are flowcharts of methods of acquiring depth information, according to one or more other exemplary embodiments.
Figure 9B:
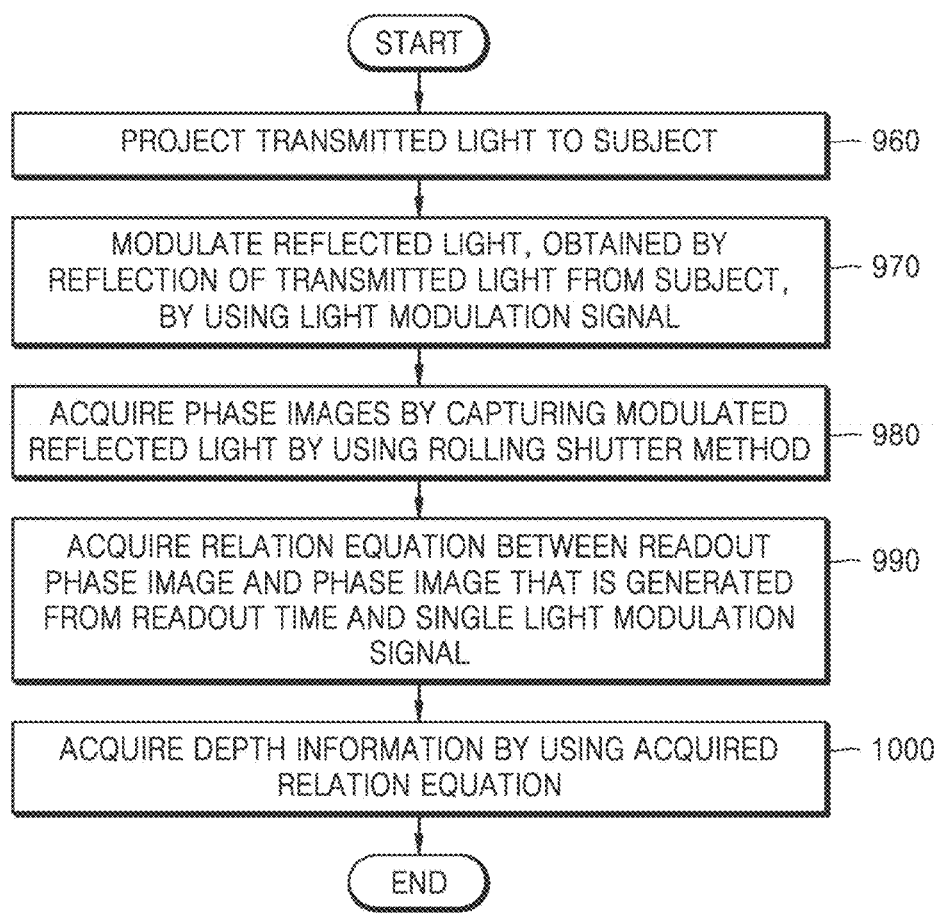

FIGS. 9A and 9B are flowcharts of methods of acquiring depth information, according to one or more other exemplary embodiments.

FIG. 9A is a flowchart of a method of acquiring depth information by projecting beams of transmitted light having different phases, according to an exemplary embodiment.

In the current exemplary embodiment, a mathematical model equation is used to solve a problem in which a generated depth image is distorted when a phase image read out with respect to each scan line includes a phase image generated from beams of transmitted light having different phases.

In operation 910, the depth image acquisition apparatus 100 sequentially projects, to a subject, N beams of transmitted light having different phases, generated from a light source (where N is a natural number that is equal to or greater than 3).

Below, the description will focus on an exemplary embodiment in which N is 4 and the beams of transmitted light have the same amplitude and period and phases of 0 degrees, 90 degrees, 180 degrees, and 270 degrees.

In operation 920, the depth image acquisition apparatus 100 modulates beams of reflected light, obtained by reflection of the beams of transmitted light from the subject, by using a light modulation signal.

In an exemplary embodiment, a period of the beams of transmitted light having different phases may be the same as that of the light modulation signal.

In operation 930, the depth image acquisition apparatus 100 acquires N phase images corresponding to the beams of transmitted light by capturing the modulated beams of reflected light with respect to each scan line by using the rolling shutter method.

The depth image acquisition apparatus 100 may accumulate the modulated beams of reflected light for a predetermined exposure time with respect to each scan line and read out the N phase images corresponding to the beams of transmitted light.

The readout phase image includes a portion of a phase image generated from an x-th beam of transmitted light and a portion of a phase image generated from an (x+1)-th beam of transmitted light, according to a readout time for a previous scan line.

In operation 940, the depth image acquisition apparatus 100 acquires, with respect to each of the N beams of transmitted light, a first relation equation among a readout phase image corresponding to an x-th beam of the N beams of transmitted light, a readout time for a previous scan line, and a phase image generated from a single beam of transmitted light, with respect to each scan line.

The first relation equation may be, for example, as expressed in Equation 17 and is described in detail with reference to FIG. 10 below.

$$I_i^{(0)} = I_{CISi}^{(0)} + ie(I_{CISi}^{(90)} - I_{CISi}^{(0)})$$

$$I_i^{(90)} = I_{CISi}^{(90)} + ie(I_{CISi}^{(180)} - I_{CISi}^{(90)})$$

$$I_i^{(180)} = I_{CISi}^{(180)} + ie(I_{CISi}^{(270)} - I_{CISi}^{(180)})$$

$$I_i^{(270)} = I_{CISi}^{(270)} + ie(I_{CISi}^{(0)'} - I_{CISi}^{(270)}) \quad \text{[Equation 17]}$$

Here, "e" may be defined by Equation 18.

$$e = \frac{t_{ro}}{t_{exp}} \quad \text{[Equation 18]}$$

In operation 950, depth information for each scan line is acquired by using N first relation equations shown in Equation 17.

The depth image acquisition apparatus 100 may acquire a phase image generated from a single beam of transmitted light based on a readout phase image.

The depth image acquisition apparatus 100 may acquire a transformation matrix between the readout phase image and the phase image generated from the single beam of transmitted light, based on the N first relation equations.

For example, the depth image acquisition apparatus 100 may acquire a matrix equation (i.e., determinant) as Equation 19 from Equation 17 and acquire a transformation matrix as Equation 20 from Equation 19.

$$\begin{bmatrix} I_i^{(0)} \\ I_i^{(90)} \\ I_i^{(180)} \\ I_i^{(270)} \end{bmatrix} = \begin{bmatrix} 1-ie & ie & 0 & 0 \\ 0 & 1-ie & ie & 0 \\ 0 & 0 & 1-ie & ie \\ ie & 0 & 0 & 1-ie \end{bmatrix} \begin{bmatrix} I_{CISi}^{(0)} \\ I_{CISi}^{(90)} \\ I_{CISi}^{(180)} \\ I_{CISi}^{(270)} \end{bmatrix} \quad \text{[Equation 19]}$$

$$\begin{bmatrix} 1-ie & ie & 0 & 0 \\ 0 & 1-ie & ie & 0 \\ 0 & 0 & 1-ie & ie \\ ie & 0 & 0 & 1-ie \end{bmatrix} \quad \text{[Equation 20]}$$

The depth image acquisition apparatus 100 may acquire a phase image, which is generated from a single beam of transmitted light, by applying an inverse matrix of the acquired transformation matrix to the readout phase image.

For example, the depth image acquisition apparatus 100 may acquire a phase image, which is generated from a single beam of transmitted light as in Equation 21, by applying an inverse matrix of the transformation matrix of Equation 20 to the readout phase image.

$$\begin{bmatrix} I_{CISi}^{(0)} \\ I_{CISi}^{(90)} \\ I_{CISi}^{(180)} \\ I_{CISi}^{(270)} \end{bmatrix} = \begin{bmatrix} 1-ie & ie & 0 & 0 \\ 0 & 1-ie & ie & 0 \\ 0 & 0 & 1-ie & ie \\ ie & 0 & 0 & 1-ie \end{bmatrix}^{-1} \begin{bmatrix} I_i^{(0)} \\ I_i^{(90)} \\ I_i^{(180)} \\ I_i^{(270)} \end{bmatrix} \quad \text{[Equation 21]}$$

The depth image acquisition apparatus 100 may acquire a phase delay due to a TOF by using the phase image generated from the single beam of transmitted light.

For example, the depth image acquisition apparatus 100 may acquire a phase delay due to a TOF by applying a phase image, which is generated from a single beam of transmitted light obtained from Equation 21, to Equation 1.

The method of acquiring depth information, according to the present exemplary embodiment, may not acquire a phase image, which is generated from a single beam of transmitted light, because the method may not calculate an inverse matrix when a matrix equation (i.e., determinant) of a transformation matrix is 0.

A method of acquiring depth information, according to an exemplary embodiment to be described below, may acquire a phase delay due to a TOF even though a matrix equation (i.e., determinant) of a transformation matrix is 0.

A readout phase image has a form that is expressed by Equation 2. For example, a readout phase image is as expressed in Equation 22.

$$I_{CIS}^{(0)} = r \times A \times \cos \phi_{TOF} + r \times B$$

$$I_{CIS}^{(90)} = -r \times A \times \sin \phi_{TOF} + r \times B$$

$$I_{CIS}^{(180)} = -r \times A \times \cos \phi_{TOF} + r \times B$$

$$I_{CIS}^{(270)} = r \times A \times \sin \phi_{TOF} + r \times B \quad \text{[Equation 22]}$$

Here, "r" denotes surface reflectivity of a subject, "A" denotes a coefficient indicating the sizes of the transmitted light and light modulation signal, "B" denotes a coefficient indicating direct current (DC) components of the transmitted light and light modulation signal, and $\phi_{TOF}$ denotes a phase delay due to a TOF. $I_{CIS}^{(0)}$ denotes a phase image that is generated from transmitted light having a phase of 0 degrees, $I_{CIS}^{(90)}$ denotes a phase image that is generated from transmitted light having a phase of 90 degrees, $I_{CIS}^{(180)}$ denotes a phase image that is generated from transmitted light having a phase of 180 degrees, and $I_{CIS}^{(270)}$ denotes a phase image that is generated from transmitted light having a phase of 270 degrees.

The depth image acquisition apparatus 100 may acquire N second relation equations that relate to a difference between a readout phase image corresponding to an x-th beam of N beams of transmitted light and a readout phase image corresponding to an (x+1)-th beam of the N beams of transmitted light.

For example, a second relation equation, which relates to a difference between a readout phase image corresponding to transmitted light having a phase of 0 degrees and a readout phase image corresponding to transmitted light having a phase of 90 degrees, may be expressed as Equation 23.

[Equation 23]

$$I_i^{(0)} - I_i^{(90)} = I_{CISi}^{(0)} - I_{CISi}^{(90)} + ie(2I_{CISi}^{(90)} - I_{CISi}^{(0)} - I_{CISi}^{(180)})$$
$$= I_{CISi}^{(0)} - I_{CISi}^{(90)} + ie(I_{CISi}^{(90)} - I_{CISi}^{(0)} + I_{CISi}^{(90)} - I_{CISi}^{(180)})$$
$$= (1-ie)(I_{CISi}^{(0)} - I_{CISi}^{(90)}) + ie(I_{CISi}^{(90)} - I_{CISi}^{(180)})$$

In the same manner, a second relation equation, which relates to a difference between a readout phase image corresponding to transmitted light having a phase of 90 degrees and a readout phase image corresponding to transmitted light having a phase of 180 degrees, may be expressed as Equation 24.

$$I_i^{(90)} - I_i^{(180)} = (1-ie)(I_{CISi}^{(90)} - I_{CISi}^{(180)}) + ie(I_{CISi}^{(180)} - I_{CISi}^{(270)})$$ [Equation 24]

In the same manner, a second relation equation, which relates to a difference between a readout phase image corresponding to transmitted light having a phase of 180 degrees and a readout phase image corresponding to transmitted light having a phase of 270 degrees, may be expressed as Equation 25.

$$I_i^{(180)} - I_i^{(270)} = (1-ie)(I_{CISi}^{(180)} - I_{CISi}^{(270)}) + ie(I_{CISi}^{(270)} - I_{CISi}^{(0)})$$ [Equation 25]

In the same manner, a second relation equation, which relates to a difference between a readout phase image corresponding to transmitted light having a phase of 270 degrees and a readout phase image corresponding to transmitted light having a phase of 0 degrees, may be expressed as Equation 26.

$$I_i^{(270)} - I_i^{(0)} = (1-ie)(I_{CISi}^{(270)} - I_{CISi}^{(0)}) + ie(I_{CISi}^{(0)} - I_{CISi}^{(90)})$$ [Equation 26]

The depth image acquisition apparatus 100 may select at least two of the N second relation equations and then calculate a phase delay from Equation 3.

For example, Equations 23 through 26 may be expressed as a matrix of Equation 27.

$$\begin{bmatrix} I_i^{(0)} - I_i^{(90)} \\ I_i^{(90)} - I_i^{(180)} \\ I_i^{(180)} - I_i^{(270)} \\ I_i^{(270)} - I_i^{(0)} \end{bmatrix} = \begin{bmatrix} 1-ie & ie & 0 & 0 \\ 0 & 1-ie & ie & 0 \\ 0 & 0 & 1-ie & ie \\ ie & 0 & 0 & 1-ie \end{bmatrix} \begin{bmatrix} I_{CISi}^{(0)} - I_{CISi}^{(90)} \\ I_{CISi}^{(90)} - I_{CISi}^{(180)} \\ I_{CISi}^{(180)} - I_{CISi}^{(270)} \\ I_{CISi}^{(270)} - I_{CISi}^{(0)} \end{bmatrix}$$ [Equation 27]

When $I_{CIS}^{(0)}$, $I_{CIS}^{(90)}$, $I_{CIS}^{(180)}$, and $I_{CIS}^{(270)}$ of Equation 22 are applied to Equation 27, Equation 28 is obtained.

[Equation 28]

$$\begin{bmatrix} I_i^{(0)} - I_i^{(90)} \\ I_i^{(90)} - I_i^{(180)} \\ I_i^{(180)} - I_i^{(270)} \\ I_i^{(270)} - I_i^{(0)} \end{bmatrix} = rA \begin{bmatrix} 1-ie & ie & 0 & 0 \\ 0 & 1-ie & ie & 0 \\ 0 & 0 & 1-ie & ie \\ ie & 0 & 0 & 1-ie \end{bmatrix} \begin{bmatrix} \cos\phi_{TOF} + \sin\phi_{TOF} \\ \cos\phi_{TOF} - \sin\phi_{TOF} \\ -\cos\phi_{TOF} - \sin\phi_{TOF} \\ -\cos\phi_{TOF} + \sin\phi_{TOF} \end{bmatrix}$$

$$= rA \begin{bmatrix} 1-ie & ie & 0 & 0 \\ 0 & 1-ie & ie & 0 \\ 0 & 0 & 1-ie & ie \\ ie & 0 & 0 & 1-ie \end{bmatrix} \begin{bmatrix} 1 & 1 \\ 1 & -1 \\ -1 & -1 \\ -1 & 1 \end{bmatrix} \begin{bmatrix} \cos\phi_{TOF} \\ \sin\phi_{TOF} \end{bmatrix}$$

$$= rA \begin{bmatrix} 1 & 1-2ie \\ 1-2ie & -1 \\ -1 & -1+2ie \\ -1+2ie & 1 \end{bmatrix} \begin{bmatrix} \cos\phi_{TOF} \\ \sin\phi_{TOF} \end{bmatrix}$$

The depth image acquisition apparatus 100 may select at least two rows of Equation 28 and acquire an equation $V_i$ that expresses $\sin\phi_{TOF}$ by using N readout phase images and a readout time (specifically, $$i \times e = i \times \frac{t_{ro}}{t_{exp}},$$

a time $i \times t_{ro}$ for reading out previous scan lines with respect to a predetermined exposure time $t_{exp}$ for acquiring one phase image), that is, "ie." Also, the depth image acquisition apparatus 100 may select at least two rows of Equation 28 and acquire an equation $U_i$ that expresses $\cos\phi_{TOF}$ by using the N readout phase images and the readout time (specifically, $$i \times e = i \times \frac{t_{ro}}{t_{exp}},$$

the time $i \times t_{ro}$ required for reading out previous scan lines with respect to the predetermined exposure time $t_{exp}$ for acquiring one phase image), that is, "ie."

The depth image acquisition apparatus 100 may acquire a phase delay due to a TOF by applying an acquired $V_i$ and an acquired $U_i$ to Equation 3.

For example, when first and second rows of Equation 28 are added to each other and third and fourth rows of Equation 28 are added to each other, Equation 29 is obtained.

$$\begin{bmatrix} I_i^{(0)} - I_i^{(180)} \\ I_i^{(90)} - I_i^{(270)} \end{bmatrix} = rA \begin{bmatrix} 2-2ie & -2ie \\ -2ie & -2+2ie \end{bmatrix} \begin{bmatrix} \cos\phi_{TOF} \\ \sin\phi_{TOF} \end{bmatrix}$$ [Equation 29]

A process of obtaining $V_i$ and $U_i$ from Equation 29 is as expressed in Equation 30.

$$\begin{bmatrix} \cos\phi_{TOF} \\ \sin\phi_{TOF} \end{bmatrix} = \frac{1}{rA\,\det}\begin{bmatrix} -2+2ie & 2ie \\ 2ie & 2-2ie \end{bmatrix}\begin{bmatrix} I_i^{(0)} - I_i^{(180)} \\ I_i^{(90)} - I_i^{(270)} \end{bmatrix}$$ [Equation 30]

where $\det = -4 + 8ie - 8(ie)^2$.

$U_i = \cos\phi_{TOF} = (I_i^{(0)} - I_i^{(180)}) -$
$\qquad ie(I_i^{(0)} + I_i^{(90)} - I_i^{(180)} - I_i^{(270)})$ $V_i = \sin\phi_{TOF} = (-I_i^{(90)} + I_i^{(270)}) -$
$\qquad ie(I_i^{(0)} - I_i^{(90)} - I_i^{(180)} + I_i^{(270)})$ A phase delay due to a TOF obtained from Equation 30 is as expressed in Equation 31.

$$\phi_{TOFi} = \tan^{-1}\left[\frac{V_i}{U_i}\right] = \tan^{-1}\left[\frac{(-I_i^{(90)} + I_i^{(270)}) - ie(I_i^{(0)} - I_i^{(90)} - I_i^{(180)} + I_i^{(270)})}{(I_i^{(0)} - I_i^{(180)}) - ie(I_i^{(0)} + I_i^{(90)} - I_i^{(180)} - I_i^{(270)})}\right]$$ [Equation 31]

In addition to Equations 29 through 31, a calculation equation for obtaining a phase delay may be variously expressed according to at least two rows selected in Equation 28.

A calculation equation for obtaining a phase delay may be variously derived according to a method of solving a simultaneous Equation 28 besides Equation 31.

That is, the depth information acquisition method described above may acquire a phase delay due to a TOF even though a matrix equation (i.e., determinant) of a transformation matrix is 0. Also, the depth information acquisition method described above may acquire a phase delay due to a TOF from a phase image read out without going through a process of acquiring a phase image that is generated from a single beam of transmitted light.

FIG. 9B is a flowchart of a method of acquiring depth information by using light modulation signals having different phases, according to an exemplary embodiment.

In the current exemplary embodiment, a mathematical model equation is used to solve a problem in which a generated depth image is distorted when a phase image read out with respect to each scan line includes a phase image generated from light modulation signals having different phases.

In operation 960, the depth image acquisition apparatus 100 projects, to a subject, transmitted light having a constant amplitude, a constant period, and a single phase, which are generated from a light source.

In operation 970, the depth image acquisition apparatus 100 modulates reflected light, obtained by reflection of the transmitted light from the subject, by using a light modulation signal.

The light modulation signal may include N light modulation signals that have a constant amplitude and period, have the same frequency as the transmitted light, and have different phases from each other. Below, the description will focus on an exemplary embodiment in which N is 4 and the beams of transmitted light have the same amplitude and period and phases of 0 degrees, 90 degrees, 180 degrees, and 270 degrees.

In operation 980, the depth image acquisition apparatus 100 acquires N phase images corresponding to the N light modulation signals by capturing the modulated beams of reflected light with respect to each scan line by using the rolling shutter method.

The depth image acquisition apparatus 100 may accumulate the modulated beams of reflected light for a predetermined exposure time with respect to each scan line and read out the N phase images corresponding to the N light modulation signals.

The readout phase images include a portion of a phase image generated from an x-th light modulation signal and a portion of a phase image generated from an (x+1)-th light modulation signal, according to a readout time for a previous scan line.

In operation 990, the depth image acquisition apparatus 100 acquires, with respect to each of the N light modulation signals, a first relation equation among a readout phase image corresponding to an x-th light modulation signal of the N light modulation signals, a readout time for a previous scan line, and a phase image generated from a single light modulation signal, with respect to each scan line.

The first relation equation is, for example, as expressed in Equation 17 and is described in detail with reference to FIG. 10 below.

In operation 1000, depth information for each scan line is acquired by using N first relation equations shown in Equation 17.

The depth image acquisition apparatus 100 may acquire a phase image generated from a single light modulation signal based on a readout phase image.

The depth image acquisition apparatus 100 may acquire a transformation matrix between the readout phase image and the phase image generated from the single light modulation signal, based on the N first relation equations.

For example, the depth image acquisition apparatus 100 may acquire a matrix equation (i.e., determinant) as Equation 19 from Equation 17 and acquire a transformation matrix as Equation 20 from Equation 19.

The depth image acquisition apparatus 100 may acquire a phase image, which is generated from a single light modulation signal, by applying an inverse matrix of the acquired transformation matrix to the readout phase image.

For example, the depth image acquisition apparatus 100 may acquire a phase image, which is generated from a single light modulation signal as in Equation 21, by applying an inverse matrix of the transformation matrix of Equation 20 to the readout phase image.

The depth image acquisition apparatus 100 may acquire a phase delay due to a TOF by using the phase image generated from the single light modulation signal.

For example, the depth image acquisition apparatus 100 may acquire a phase delay due to a TOF by applying a phase image, which is generated from a single light modulation signal obtained from Equation 21, to Equation 1.

The method of acquiring depth information, according to the present exemplary embodiment, may not acquire a phase image, which is generated from a single light modulation signal, because the method may not calculate an inverse matrix when a matrix equation (i.e., determinant) of a transformation matrix is 0.

A method of acquiring depth information, according to an exemplary embodiment to be described below, may acquire a phase delay due to a TOF even though a matrix equation (i.e., determinant) of a transformation matrix is 0.

A readout phase image has a form that is expressed by Equation 2. For example, a readout phase image may be as expressed in Equation 32.

$I_{CIS}^{(0)} = r \times A \times \cos\phi_{TOF} + r \times B$ $I_{CIS}^{(90)} = -r \times A \times \sin\phi_{TOF} + r \times B$ $$I_{CIS}^{(180)} = -r \times A \times \cos \phi_{TOF} + r \times B$$

$$I_{CIS}^{(270)} = r \times A \times \sin \phi_{TOF} + r \times B \quad \text{[Equation 32]}$$

Here, "r" denotes surface reflectivity of a subject, "A" denotes a coefficient indicating the sizes of the transmitted light and light modulation signal, "B" denotes a coefficient indicating DC components of the transmitted light and light modulation signal, and $\phi_{TOF}$ denotes a phase delay due to a TOF. $I_{CIS}^{(0)}$ denotes a phase image that is generated from a light modulation signal having a phase of 0 degrees, $I_{CIS}^{(90)}$ denotes a phase image that is generated from a light modulation signal having a phase of 90 degrees, $I_{CIS}^{(180)}$ denotes a phase image that is generated from a light modulation signal having a phase of 180 degrees, and $I_{CIS}^{(270)}$ denotes a phase image that is generated from a light modulation signal having a phase of 270 degrees.

The depth image acquisition apparatus 100 may acquire N second relation equations that relate to a difference between a readout phase image corresponding to an x-th beam of N beams of transmitted light and a readout phase image corresponding to an (x+1)-th beam of the N beams of transmitted light.

For example, a second relation equation, which relates to a difference between a readout phase image corresponding to transmitted light having a phase of 0 degrees and a readout phase image corresponding to transmitted light having a phase of 90 degrees, may be expressed as Equation 23.

In the same manner, a second relation equation, which relates to a difference between a readout phase image corresponding to transmitted light having a phase of 90 degrees and a readout phase image corresponding to transmitted light having a phase of 180 degrees, may be expressed as Equation 24.

In the same manner, a second relation equation, which relates to a difference between a readout phase image corresponding to transmitted light having a phase of 180 degrees and a readout phase image corresponding to transmitted light having a phase of 270 degrees, may be expressed as Equation 25.

In the same manner, a second relation equation, which relates to a difference between a readout phase image corresponding to transmitted light having a phase of 270 degrees and a readout phase image corresponding to transmitted light having a phase of 0 degrees, may be expressed as Equation 26.

The depth image acquisition apparatus 100 may select at least two of the N second relation equations and then calculate a phase delay from Equation 3.

For example, Equations 23 through 26 may be expressed as a matrix of Equation 27.

When $I_{CIS}^{(0)}$, $I_{CIS}^{(90)}$, $I_{CIS}^{(180)}$, and $I_{CIS}^{(270)}$ of Equation 32 are applied to Equation 27, Equation 28 is obtained.

The depth image acquisition apparatus 100 may select at least two rows of Equation 28 and acquire an equation $V_i$ that expresses $\sin \phi_{TOF}$ by using N readout phase images and a readout time (specifically, a time $i \times t_{ro}$ for reading out previous scan lines with respect to a predetermined exposure time $t_{exp}$ for acquiring one phase image), that is, "ie." Also, the depth image acquisition apparatus 100 may select at least two rows of Equation 28 and acquire an equation $U_i$ that expresses $\cos \phi_{TOF}$ by using the N readout phase images and the readout time (specifically, the time $i \times t_{ro}$ for reading out previous scan lines with respect to the predetermined exposure time $t_{exp}$ for acquiring one phase image), that is, "ie."

The depth image acquisition apparatus 100 may acquire a phase delay due to a TOF by applying an acquired $V_i$ and an acquired $U_i$ to Equation 3.

For example, when first and second rows of Equation 28 are added to each other and third and fourth rows of Equation 28 are added to each other, Equation 29 is obtained.

A process of obtaining $V_i$ and $U_i$ from Equation 29 is as expressed in Equation 30.

A phase delay due to a TOF obtained from Equation 30 is as expressed in Equation 31.

In addition to Equations 29 through 31, a calculation equation for obtaining a phase delay may be variously expressed according to at least two rows selected in Equation 28.

A calculation equation for obtaining a phase delay may be variously derived according to a method of solving Equation 28 besides Equation 31.

Figures 10A, 10B:
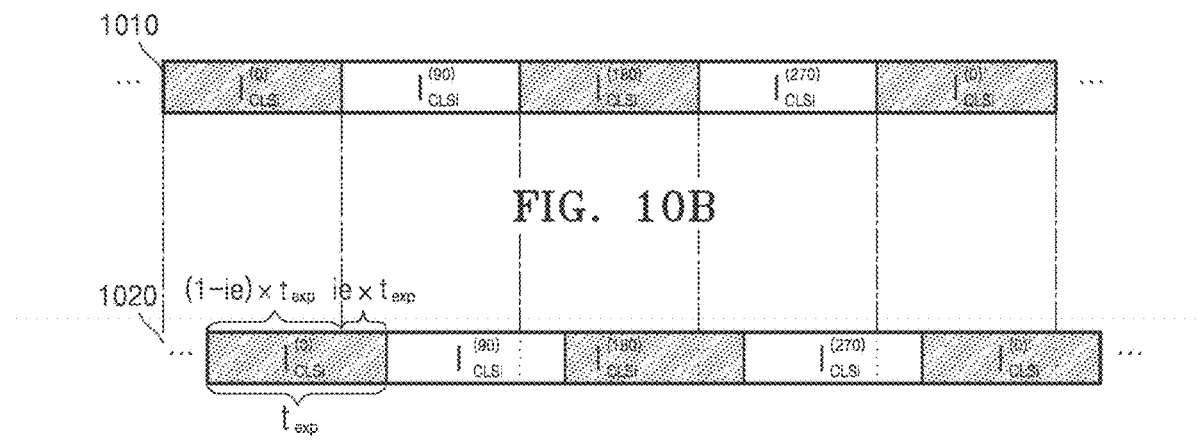
FIGS. 10A and 10B are a diagram for explaining a relation between a phase image generated from a single beam of transmitted light and a readout phase image.

FIG. 10 is a diagram for explaining a relation between a phase image generated from a single beam of transmitted light and a readout phase image.

(a) of FIG. 10 shows a phase image that is generated from a single beam of transmitted light, and (b) of FIG. 10 shows a phase image read out with respect to an (i+1)-th scan line.

With respect to the (i+1)-th scan line, a readout phase image corresponding to an x-th beam of transmitted light includes a portion of a phase image generated from the x-th beam of transmitted light and a portion of a phase image generated from an (x+1)-th beam of transmitted light, according to a readout time for a previous scan line (a first scan line through an i-th scan line).

Referring to FIG. 10, the readout phase image corresponding to the x-th beam of transmitted light is obtained by reading out a phase image generated from the x-th beam of transmitted light for a time $(1-i \times e) \times t_{exp}$ and reading out a phase image generated from the (x+1)-th beam of transmitted light for a time $i \times e \times t_{exp}$.

Accordingly, a phase image read out with respect to the (i+1)-th scan line may be represented by a relation equation between a readout time for a previous scan line and a phase image that is generated from a single beam of transmitted light, with respect to each N beam of transmitted light as in Equation 17.

Figure 11A:
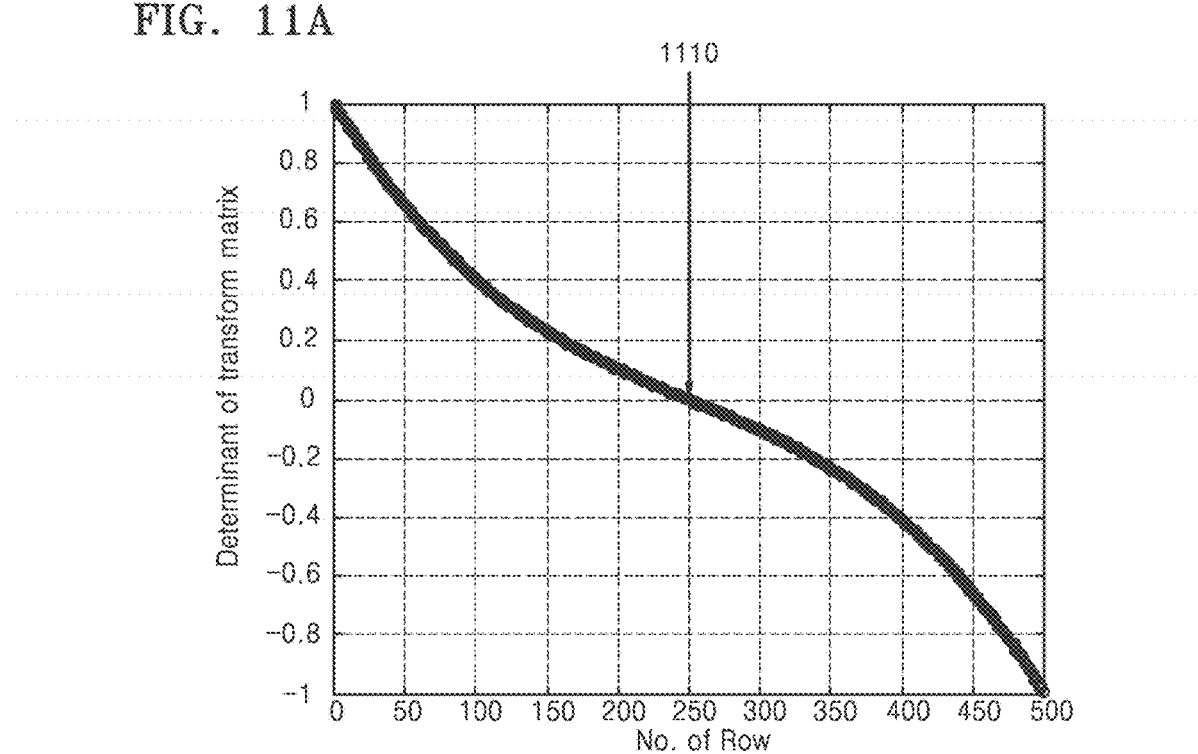
FIGS. 11A and 11B are graphs showing a value of a determinant of a transformation matrix obtained according to various exemplary embodiments.
Figure 11B:
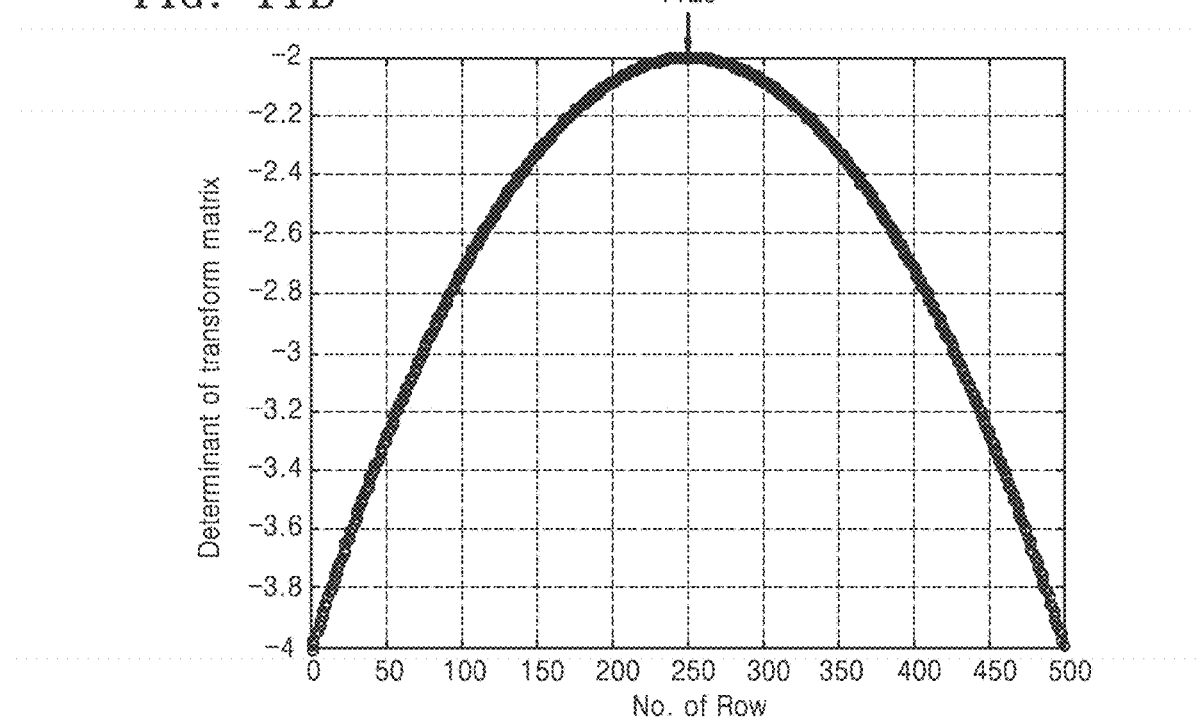

FIGS. 11A and 11B are graphs showing a value of a determinant of a transformation matrix obtained according to various exemplary embodiments.

FIG. 11A is a graph of a determinant of a transformation matrix when using a method of obtaining a phase delay due to a TOF by using a phase image that is generated from a single beam of transmitted light obtained by using a transformation matrix.

For example, in the case where a transformation matrix is as expressed in Equation 20, a value of a determinant is 0 when "ie" is 0.5, and thus, an inverse matrix does not exist.

FIG. 11B is a graph of a determinant obtained by selecting at least two of N second relation equations when using a method of obtaining a phase delay due to a TOF by using the N second relation equations that relate to a difference between a readout phase image corresponding to an x-th beam of N beams of transmitted light and a readout phase image corresponding to an (x+1)-th beam of the N beams of transmitted light.

For example, a determinant obtained from Equations 29 and 30 may satisfy Equation 33.

$$\det = \det\begin{bmatrix} 2-2ie & -2ie \\ -2ie & -2+2ie \end{bmatrix} = -4 + 8ie - 8(ie)^2 \le -2 \quad \text{[Equation 33]}$$

That is, since the value of the determinant is not 0, the depth image acquisition apparatus 100 may always calculate $V_i$ and $U_i$ and acquire a phase delay due to a TOF by applying $V_i$ and $U_i$ to Equation 3.

Figure 12:
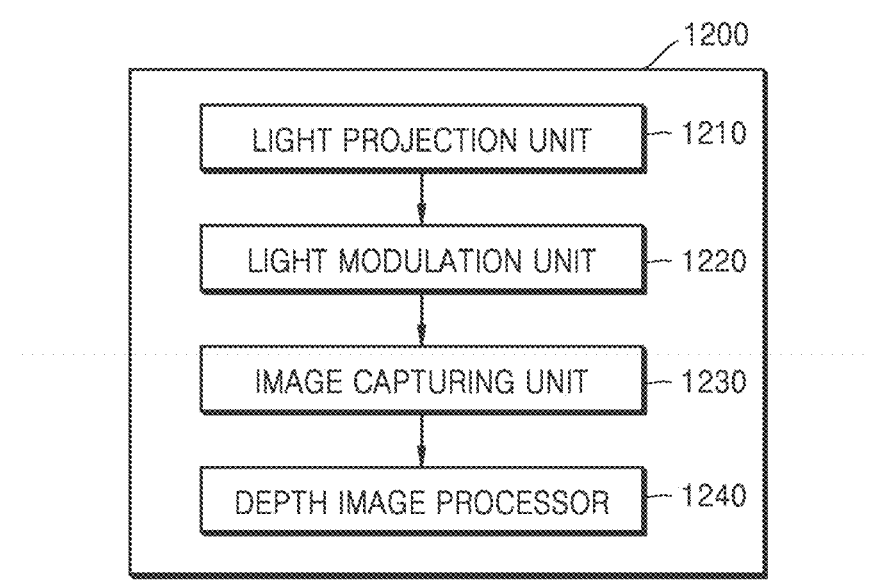
FIG. 12 is a block diagram of a depth image acquisition apparatus according to an exemplary embodiment.

FIG. 12 is a block diagram of a depth image acquisition apparatus 100 according to an exemplary embodiment.

As illustrated in FIG. 12, the depth image acquisition apparatus 100 may include a light projection unit 1210 (e.g., light projector), a light modulation unit 1220 (e.g., light modulator), an image capturing unit 1230 (e.g., image capturer), and a depth image processor 1240. However, it is understood that one or more other exemplary embodiments are not limited thereto. For example, the depth image acquisition apparatus 100 may include more or less elements than the exemplary embodiment of FIG. 12.

The light projection unit 1210 sequentially projects N beams of transmitted light having different phases, generated from a light source, to a subject (where N is a natural number that is equal to or greater than 3).

The light projection unit 1210 may include a light source for generating light having a predetermined wavelength and a light source driver for driving the light source.

The N beams of transmitted light having different phases may be discontinuously projected. The N beams of transmitted light having different phases may be generated from the light source.

The light projection unit 1210 may sequentially project the N beams of transmitted light having different phases at constant time intervals.

A phase difference between two beams of transmitted light, which are projected at subsequent time zones (e.g., time points), of the N beams of transmitted light having different phases may be a value obtained by dividing 360 degrees by N.

For example, the description will focus on a case in which N is 4 and the N beams of transmitted light having different phases have the same amplitude and period and phases of 0 degrees, 90 degrees, 180 degrees, and 270 degrees.

In one or more exemplary embodiments, the light projection unit 1210 may sequentially project N different beams of transmitted light generated from the light source to a subject for a time including an idle time for each of the beams of transmitted light. By further projecting transmitted light for a time including an idle time, a phase image read out with respect to each scan line includes only a phase image generated from a single beam of transmitted light. Accordingly, a problem, in which a phase image read out with respect to each scan line includes phase images generated from beams of transmitted light having different phases, may be mitigated or resolved.

The light modulation unit 1220 modulates beams of reflected light, obtained by reflection of the N different beams of transmitted light from the subject, by using a light modulation signal.

The light modulation unit 1220 may include a light modulator for modulating light reflected from the subject and a light modulator driver for driving the light modulator.

The image capturing unit 1230 acquires N phase images corresponding to the N beams of transmitted light by capturing the modulated beams of reflected light by using the rolling shutter method.

The image capturing unit 1230 may accumulate the modulated beams of reflected light for a predetermined exposure time with respect to each scan line and read out the N phase images corresponding to the beams of transmitted light.

In one or more exemplary embodiments, the readout phase images may include a portion of a phase image generated from an x-th beam of transmitted light and a portion of a phase image generated from an (x+1)-th beam of transmitted light, according to a readout time for a previous scan line.

The depth image processor 1240 acquires depth information by using N phase images.

In one or more exemplary embodiments, the depth image processor 1240 may acquire, with respect to each of the N beams of transmitted light, a first relation equation among a readout phase image corresponding to an x-th beam of the N beams of transmitted light, a readout time for a previous scan line, and a phase image generated from a single beam of transmitted light, with respect to each scan line. The depth image processor 1240 may acquire depth information for each scan line by using acquired N first relation equations. For example, the first relation equation may be defined by Equation 17 and Equation 18.

In one or more exemplary embodiments, the depth image processor 1240 may acquire a transformation matrix for a readout time acquired from the N first relation equations. For example, the transformation matrix may be acquired as expressed in Equations 19 and 20. The depth image processor 1240 may acquire a phase image, which is generated from a single beam of transmitted light, by applying an inverse matrix of the acquired transformation matrix to the readout phase image. For example, the depth image processor 1240 may acquire a phase image, which is generated from a single beam of transmitted light as in Equation 21, by applying an inverse matrix of the transformation matrix of Equation 20 to the readout phase image. The depth image processor 1240 may acquire a phase delay due to a TOF by using the phase image generated from the single beam of transmitted light. The depth image processor 1240 may acquire a phase delay due to a TOF by using Equation 1.

In one or more exemplary embodiments, the depth image processor 1240 may acquire a phase delay due to a TOF by using N second relation equations that relate to a difference between readout phase images corresponding to adjacent beams of transmitted light. For example, the readout phase images may have a form that is expressed by Equation 2. The depth image processor 1240 may acquire N second relation equations that relate to a difference between a readout phase image corresponding to an x-th beam of N beams of transmitted light and a readout phase image corresponding to an (x+1)-th beam of the N beams of transmitted light. For example, the N second relation equations may be expressed as Equations 23 through 26. The depth image processor 1240 may select at least two of the N second relation equations and then calculate a phase delay from Equation 3. For example, the depth image processor 1240 may acquire Equation 28 by applying $I_{CIS}^{(0)}$, $I_{CIS}^{(90)}$, $I_{CIS}^{(180)}$, and $I_{CIS}^{(270)}$ of Equation 22 to Equation 27 and acquire a phase delay due to a TOF by applying $V_i$ and $U_i$, which are acquired by selecting at least two rows, to Equation 3.

Also, the depth image processor 1240 may acquire a distance from a subject to a depth image acquisition apparatus, which captures an image of the subject, by using the acquired phase delay. For example, the depth image processor 1240 may acquire a distance from a subject to a depth image acquisition apparatus, which captures an image of the subject, by using Equation 15.

Also, the depth image processor 1240 may generate a depth image by using depth information. The depth image acquisition apparatus 100 may display the generated depth image.

FIGS. 13A through 13D and 14A and 14B illustrate results of simulations performed to verify the effects of the depth image acquisition methods according to the above-described exemplary embodiments. FIGS. 13A through 13D and 14A and 14B illustrate results of simulations performed by using a slanted flat panel (hereinafter, referred to as a slanted wall) where a distance from a camera to the flat panel is kept constant in the vertical direction and is longer in the right side direction than in the left side direction.

FIGS. 13A through 13D are diagrams exemplarily illustrating phase images generated by beams of transmitted light having different phases, with respect to a slanted wall.

The X axis of each of FIGS. 13A through 13D indicates a true distance (in the horizontal direction of an image), the Y axis of each of FIGS. 13A through 13D indicates a row number in the vertical direction of an image, and the Z axis of each of FIGS. 13A through 13D indicates a phase image in a row.

FIG. 13A shows a phase image of $I_i^{(0)} = I_{CISi}^{(0)} + ie(I_{CISi}^{(90)} - I_{CISi}^{(0)})$. The phase image shown in FIG. 13A is not uniform but changed in the vertical direction (the Y axis).

FIG. 13B shows a phase image of $I_i^{(90)} = I_{CISi}^{(90)} + ie(I_{CISi}^{(180)} - I_{CISi}^{(90)})$. The phase image shown in FIG. 13B is not uniform but changed in the vertical direction (the Y axis).

FIG. 13C shows a phase image of $I_i^{(180)} = I_{CISi}^{(180)} + ie(I_{CISi}^{(270)} - I_{CISi}^{(180)})$. The phase image shown in FIG. 13C is not uniform but changed in the vertical direction (the Y axis).

FIG. 13D shows a phase image of $I_i^{(270)} = I_{CISi}^{(270)} + ie(I_{CISi}^{(0)'} - I_{CISi}^{(270)})$. The phase image shown in FIG. 13D is not uniform but changed in the vertical direction (the Y axis).

Figure 14A:
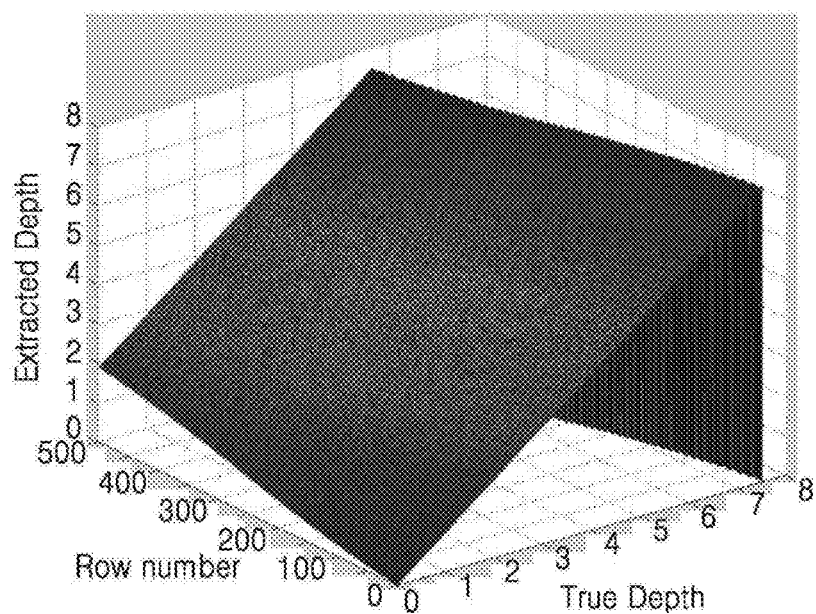
FIGS. 14A and 14B are diagram for showing effects obtained when capturing a depth image, with the rolling shutter method, by using any one of the methods according to one or more exemplary embodiments.
Figure 14B:
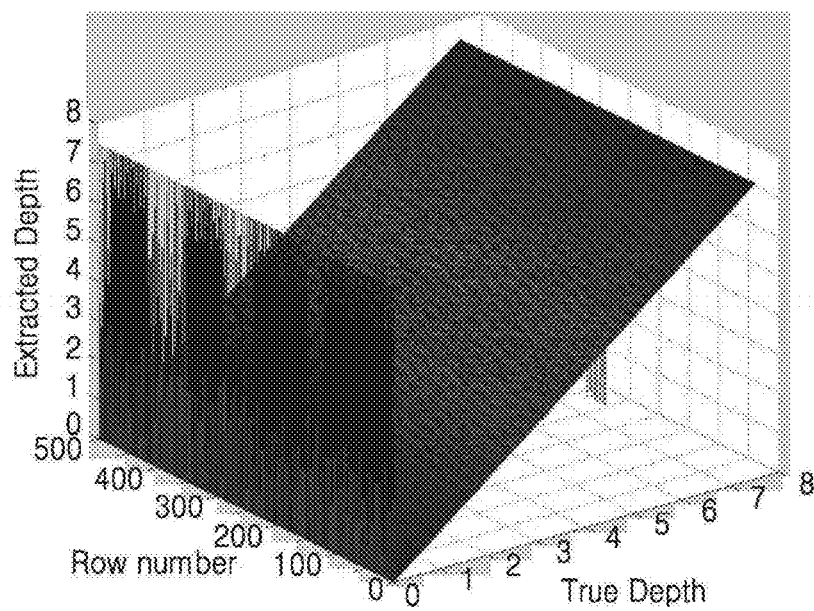

FIGS. 14A and 14B are diagram for showing effects obtained when capturing a depth image, with the rolling shutter method, by using any one of the methods according to the above-described exemplary embodiments.

FIG. 14A shows a depth acquired from phase images acquired without using the methods according to the above-described embodiments. Referring to FIG. 14A, a depth is not uniform but varies depending on the row number in the vertical direction. That is, the depth shown in FIG. 14A is different from an actual depth.

FIG. 14B shows a depth acquired from phase images acquired by using any one of the methods according to the above-described exemplary embodiments. Referring to FIG. 14B, the depth shown in FIG. 14B is equal to an actual depth.

The depth image acquisition apparatuses described herein may include a processor, a memory for storing program data and executing the program data, a permanent storage such as a disk drive, a communications port for handling communication with external devices, and user interface devices, including a display, keys, etc. When software modules are involved, these software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. This media can be read by the computer, stored in the memory, and executed by the processor.

One or more exemplary embodiments may be described in terms of functional block components and various processing steps. Such functional blocks may be realized by any number of hardware and/or software components configured to perform the specified functions. For example, the one or more exemplary embodiments may employ various integrated circuit components, e.g., memory elements, processing elements, logic elements, look-up tables, and the like, which may carry out a variety of functions under the control of one or more microprocessors or other control devices. Similarly, where elements are implemented using software programming or software elements the embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, one or more exemplary embodiments could employ any number of conventional techniques for electronics configuration, signal processing and/or control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of the inventive concept in any way. For the sake of brevity, related art electronics, control systems, software development and other functional aspects of the systems (and components of the individual operating components of the systems) may not be described in detail. Furthermore, the connecting lines, or connectors shown in the various figures presented, are intended to represent exemplary functional relationships and/or physical or logical couplings between the various elements. It should be noted that many alternative or additional functional relationships, physical connections or logical connections may be present in a practical device.

The use of the terms "a", "an", "the" and similar referents in the context of describing the present specification (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:

1. A method of obtaining depth information, the method comprising:
    sequentially projecting, to a subject, N different beams of light emitted from a light source for a time period comprising an exposure time and an idle time, subsequent to the exposure time, for each of the N different beams of light, where N is a natural number that is equal to or greater than 3;
    modulating, using a light modulation signal, beams of reflected light that are obtained by reflection of the N different beams of light from the subject;
    obtaining N phase images corresponding to the N different beams of light by capturing the modulated beams of reflected light with each scan line using a rolling shutter method during the exposure time; and
    obtaining depth information of the subject by using the obtained N phase images,
    wherein the idle time comprises a period of time equivalent to a readout time for all scan lines using the rolling shutter method.

2. A method of obtaining depth information, the method comprising:
    projecting, to a subject, light emitted from a light source;
    modulating, by sequentially using N light modulation signals having different phases for a time period comprising an exposure time and an idle time, subsequent to the exposure time, for each of the N light modulation signals, reflected light that is obtained by reflection of the light from the subject;
    obtaining N phase images corresponding to the N light modulation signals by capturing the modulated reflected light with each scan line using a rolling shutter method during the exposure time; and
    obtaining depth information of the subject by using the N phase images,
    wherein the idle time comprises a period of time equivalent to a readout time for all scan lines using the rolling shutter method.

3. A method of obtaining depth information, the method comprising:
    sequentially projecting, to a subject, N beams of light having different phases, where N is a natural number that is equal to or greater than 3;
    modulating, using a light modulation signal, beams of reflected light that are obtained by reflection of the N beams of light from the subject;
    reading out N phase images corresponding to the N beams of light by capturing the modulated beams of reflected light with each scan line using a rolling shutter method;
    with respect to each scan line, obtaining a first relation equation, for each of the N beams of light, among a readout phase image corresponding to an x-th beam of the N beams of light, a readout time for a previous scan line, and a phase image generated from a single beam of light; and
    obtaining, for each scan line, depth information of the subject by using the obtained N first relation equations to reduce distortion caused by the readout phase image comprising a portion of a phase image generated from the x-th beam of light and a portion of a phase image generated from an (x+1)-th beam of light,
    wherein the readout phase image comprises the portion of the phase image generated from the x-th beam of light and the portion of the phase image generated from the (x+1)-th beam of light, according to a readout time for a previous scan line.

4. The method of claim 3, wherein the obtaining the depth information comprises:
    obtaining a transformation matrix between the readout phase image and the phase image generated from the single beam of light, based on the N first relation equations;
    obtaining the phase image generated from the single beam of light by applying, to the readout phase image, an inverse matrix of the obtained transformation matrix; and
    obtaining a phase delay due to a time of flight (TOF) by using the phase image generated from the single beam of light.

5. The method of claim 4, wherein the N beams of light having different phases have a same amplitude and period, N is 4, and the different phases comprise 0 degrees, 90 degrees, 180 degrees, and 270 degrees.

6. The method of claim 5, wherein:
    the obtaining the phase delay due to the TOF comprises obtaining the phase delay according to:

$$\phi_{TOF} = \tan^{-1}\left(\frac{-I_{CIS}^{(90)} + I_{CIS}^{(270)}}{I_{CIS}^{(0)} - I_{CIS}^{(180)}}\right),$$

wherein $\phi_{TOF}$ denotes the phase delay due to the TOF, $I_{CIS}^{(0)}$ denotes a phase image generated from light having a phase of 0 degrees, $I_{CID}^{(90)}$ denotes a phase image generated from light having a phase of 90 degrees, $I_{CIS}^{(180)}$ denotes a phase image generated from light having a phase of 180 degrees, and $I_{CIS}^{(270)}$ denotes a phase image generated from light having a phase of 270 degrees.

7. The method of claim 3, wherein the readout phase image has a form that is expressed by:

$$I_{CIS}^{(\theta)} = r \times A \times \cos(\phi_{TOF} + \theta) + r \times B,$$

wherein $\theta$ denotes a phase of the light, r denotes surface reflectivity of the subject, A denotes a coefficient indicating sizes of the light and the light modulation signal, B denotes a coefficient indicating direct current (DC) components of the light and the light modulation signal, and $\phi_{TOF}$ denotes a phase delay due to a TOF.

8. The method of claim 7, wherein the obtaining the depth information comprises:
    obtaining N second relation equations that relate to a difference between the readout phase image corresponding to the x-th beam of the N beams of light and a readout phase image corresponding to the (x+1)-th beam of the N beams of light; and
    selecting at least two of the N second relation equations and calculating the phase delay according to:

$$\phi_{TOF} = \tan^{-1}\left[\frac{V_i}{U_i}\right],$$

wherein $\phi_{TOF}$ denotes the phase delay due to the TOF, $V_i$ denotes an equation that expresses $\sin \phi_{TOF}$ by the readout N phase images and the readout time by using the N second relation equations, and $U_i$ denotes an equation that expresses cos $\phi_{TOF}$ by the readout N phase images and the readout time by using the N second relation equations.

9. The method of claim 8, wherein the N beams of light having different phases have a same amplitude and period, N is 4, and the different phases comprise 0 degrees, 90 degrees, 180 degrees, and 270 degrees.

10. The method of claim 3, wherein periods of the N beams of light are the same as that of the light modulation signal.

11. The method of claim 3, wherein the reading out the N phase images comprises accumulating the modulated beams of reflected light for a predetermined exposure time with respect to each scan line to read out the N phase images corresponding to the N beams of light.

12. The method of claim 3, wherein the obtaining the depth information comprises:
   obtaining a phase delay due to a TOF of the reflected light by using the readout N phase images, with respect to each scan line; and
   obtaining a distance from the subject to a depth image acquisition apparatus, which captures an image of the subject, by using the obtained phase delay.

13. The method of claim 3, further comprising generating a depth image by using the obtained depth information.

14. A method of obtaining depth information, the method comprising:
   projecting, to a subject, light emitted from a light source;
   modulating, by sequentially using N light modulation signals having different phases, reflected light that is obtained by reflection of the transmitted light from the subject;
   reading out N phase images corresponding to the N light modulation signals by capturing the modulated reflected light with each scan line using a rolling shutter method;
   with respect to each scan line, obtaining a first relation equation, for each of the N light modulation signals, among a readout phase image corresponding to an x-th light modulation signal of the N light modulation signals, a readout time for a previous scan line, and a phase image generated from a single light modulation signal; and
   obtaining, for each scan line, depth information of the subject by using the obtained N first relation equations to reduce distortion caused by the readout phase image comprising a portion of a phase image generated from the x-th light modulation signal and the portion of the phase image generated from the (x+1)-th light modulation signal,
   wherein the readout phase image comprises the portion of the phase image generated from the x-th light modulation signal and the portion of the phase image generated from the (x+1)-th light modulation signal, according to a readout time for a previous scan line.

15. A depth image acquisition apparatus comprising:
   a light projector configured to sequentially project, to a subject, N different beams of light emitted from a light source for a time period comprising an exposure time and an idle time, subsequent to the exposure time, for each of the N different beams of light, where N is a natural number that is equal to or greater than 3;
   a light modulator configured to modulate, using a light modulation signal, beams of reflected light that are obtained by reflection of the N different beams of light from the subject;
   an image capturer configured to obtain N phase images corresponding to the N different beams of light by capturing the modulated beams of reflected light with each scan line using a rolling shutter method during the exposure time; and
   a depth image processor configured to obtain depth information of the subject by using the obtained N phase images,
   wherein the idle time comprises a period of time equivalent to a readout time for all scan lines using the rolling shutter method.

16. A depth image acquisition apparatus comprising:
   a light projector configured to sequentially project, to a subject, N beams of light having different phases, where N is a natural number that is equal to or greater than 3;
   a light modulator configured to modulate, using a light modulation signal, beams of reflected light that are obtained by reflection of the N beams of light from the subject;
   an image capturer configured to read out N phase images corresponding to the N beams of light by capturing the modulated beams of reflected light with each scan line using a rolling shutter method; and
   a depth image processor configured to, with respect to each scan line, obtain a first relation equation, for each of the N beams of light, among a readout phase image corresponding to an x-th beam of the N beams of light, a readout time for a previous scan line, and a phase image generated from a single beam of light, and configured to obtain, for each scan line, depth information of the subject by using the obtained N first relation equations to reduce distortion caused by the readout phase image comprising a portion of a phase image generated from the x-th beam of light and a portion of a phase image generated from an (x+1)-th beam of light,
   wherein the readout phase image comprises the portion of the phase image generated from the x-th beam of light and the portion of the phase image generated from the (x+1)-th beam of light, according to a readout time for a previous scan line.

17. The depth image acquisition apparatus of claim 16, wherein the depth image processor is configured to:
   obtain a transformation matrix between the readout phase image and the phase image generated from the single beam of light, based on the N first relation equations;
   obtain the phase image generated from the single beam of light by applying, to the readout phase image, an inverse matrix of the obtained transformation matrix; and
   obtain a phase delay due to a TOF by using the phase image generated from the single beam of light.

18. The depth image acquisition apparatus of claim 16, wherein the readout phase image has a form that is expressed by:

$$I_{CIS}^{(\theta)} = r \times A \times \cos(\phi_{TOF} + \theta) + r \times B,$$

wherein $\theta$ denotes a phase of the light, r denotes surface reflectivity of the subject, A denotes a coefficient indicating the sizes of the light and the light modulation signal, B denotes a coefficient indicating direct current (DC) components of the light and the light modulation signal, and $\phi_{TOF}$ denotes a phase delay due to a TOF.

19. The depth image acquisition apparatus of claim 18, wherein the depth image processor is configured to obtain N second relation equations that relate to a difference between the readout phase image corresponding to an x-th beam of the N beams of light and a readout phase image corresponding to the (x+1)-th beam of the N beams of light, and to select at least two of the N second relation equations and calculate a phase delay according to:

$$\phi_{TOF} = \tan^{-1}\left[\frac{V_i}{U_i}\right],$$

wherein $\phi_{TOF}$ denotes the phase delay due to the TOF, $V_i$ denotes an equation that expresses $\sin \phi_{TOF}$ by the readout N phase images and the readout time by using the N second relation equations, and $U_i$ denotes an equation that expresses $\cos \phi_{TOF}$ by the readout N phase images and the readout time by using the N second relation equations.

* * * * *